(12) United States Patent
Hakemi et al.

(10) Patent No.: US 10,851,302 B2
(45) Date of Patent: Dec. 1, 2020

(54) METAL ORGANIC LIQUID CRYSTAL DYES

(71) Applicant: GAUZY LTD., Tel-Aviv (IL)

(72) Inventors: Hassan-Ali Hakemi, Macherio (IT); Adrian Lofer, Kfar Saba (IL); Eyal Peso, Bat Yam (IL)

(73) Assignee: GAUZY LTD., Tel-Aviv (IL)

(*) Notice: Subject to any disclaimer, the term of this patent is extended or adjusted under 35 U.S.C. 154(b) by 0 days.

(21) Appl. No.: 15/520,497

(22) PCT Filed: May 25, 2015

(86) PCT No.: PCT/IL2015/050543
§ 371 (c)(1),
(2) Date: Apr. 20, 2017

(87) PCT Pub. No.: WO2016/063273
PCT Pub. Date: Apr. 28, 2016

(65) Prior Publication Data
US 2017/0355908 A1   Dec. 14, 2017

Related U.S. Application Data

(60) Provisional application No. 62/065,805, filed on Oct. 20, 2014.

(51) Int. Cl.
| | |
|---|---|
| *G02F 1/1333* | (2006.01) |
| *C09K 19/60* | (2006.01) |
| *C09B 45/22* | (2006.01) |
| *C09B 55/00* | (2006.01) |
| *C09K 19/40* | (2006.01) |
| *C09B 23/14* | (2006.01) |
| *C09B 57/10* | (2006.01) |
| *G02F 1/1334* | (2006.01) |

(52) U.S. Cl.
CPC ............ *C09K 19/60* (2013.01); *C09B 23/148* (2013.01); *C09B 45/22* (2013.01); *C09B 55/001* (2013.01); *C09B 55/002* (2013.01); *C09B 55/005* (2013.01); *C09B 57/10* (2013.01); *C09K 19/40* (2013.01); *C09K 19/605* (2013.01); *G02F 1/1334* (2013.01); *G02F 2202/04* (2013.01)

(58) Field of Classification Search
CPC ...... C09K 19/60; C09K 19/40; C09K 19/605; G02F 1/1333; G02F 1/1334; G02F 2202/04; C09B 23/148; C09B 45/22; C09B 55/001; C09B 55/002; C09B 55/005; C09B 57/10
USPC .................................................. 252/299.01
See application file for complete search history.

(56) References Cited

U.S. PATENT DOCUMENTS

| | | |
|---|---|---|
| 4,423,191 A | 12/1983 | Haven et al. |
| 4,934,423 A | 6/1990 | Withrow et al. |
| 4,938,568 A | 7/1990 | Margerum et al. |
| 5,459,594 A | 10/1995 | Nakanishi et al. |
| 5,631,665 A | 5/1997 | Takizawa et al. |
| 5,712,692 A | 1/1998 | Kanagawa et al. |
| 5,843,333 A | 12/1998 | Hakemi |
| 6,049,366 A | 4/2000 | Hakemi et al. |
| 6,275,208 B1 | 8/2001 | Park |
| 6,722,142 B1 | 4/2004 | Pagel |
| 6,741,239 B2 | 5/2004 | Iwasaki |
| 6,819,367 B1 | 11/2004 | Cava |
| 6,982,178 B2 | 1/2006 | LeCain et al. |
| 7,091,351 B2 | 8/2006 | Dong et al. |
| 7,238,397 B2 | 7/2007 | Iftime et al. |
| 8,107,050 B2 | 1/2012 | Hsieh et al. |
| 2004/0222814 A1 | 11/2004 | Kim et al. |
| 2005/0001954 A1 | 1/2005 | Stephenson et al. |
| 2006/0046017 A1 | 3/2006 | Adickes |
| 2006/0122532 A1 | 6/2006 | Lee |
| 2008/0218752 A1 | 9/2008 | Hagler |
| 2008/0263963 A1 | 10/2008 | Lee et al. |
| 2009/0151606 A1 | 6/2009 | Korber et al. |
| 2009/0273737 A1 | 11/2009 | Zhao et al. |
| 2010/0025641 A1 | 2/2010 | Jimbo et al. |
| 2010/0245321 A1 | 9/2010 | Ogita et al. |
| 2012/0068951 A1 | 3/2012 | Venkatasubramanian |
| 2012/0105424 A1 | 5/2012 | Lee et al. |
| 2012/0169987 A1 | 7/2012 | Li et al. |
| 2012/0307337 A1 | 12/2012 | Bartug et al. |
| 2013/0053468 A1 | 2/2013 | Lee et al. |
| 2013/0188105 A1 | 7/2013 | Dobrenko et al. |
| 2013/0272833 A1 | 10/2013 | Duncan et al. |
| 2013/0321744 A1 | 12/2013 | Lin et al. |
| 2013/0342773 A1 | 12/2013 | Chu et al. |
| 2014/0132909 A1 | 5/2014 | Wardhana et al. |
| 2014/0313105 A1 | 10/2014 | Peso et al. |
| 2015/0338715 A1 | 11/2015 | Schaefer et al. |
| 2017/0075152 A1 | 3/2017 | Lofer et al. |
| 2017/0355908 A1* | 12/2017 | Hakemi ................ C09K 19/40 |

FOREIGN PATENT DOCUMENTS

| | | |
|---|---|---|
| EP | 1372023 A2 | 12/2003 |
| EP | 2016/063273 A1 | 4/2016 |
| FR | 2749450 A1 | 12/1997 |
| JP | 6068704 A | 11/1994 |
| WO | 2006/014041 A1 | 2/2006 |
| WO | 2012/042518 A1 | 4/2012 |
| WO | 2015/170318 A2 | 11/2015 |
| WO | 2016/063277 A2 | 4/2016 |
| WO | 2016/071908 A1 | 5/2016 |

OTHER PUBLICATIONS

Corresponding U.S. Appl. No. 15/520,449, filed Apr. 20, 2017 (not published yet).

(Continued)

*Primary Examiner* — Geraldina Visconti

(57) ABSTRACT

A dye composition dissolvable within a liquid crystal host device (including: polymer dispersed liquid crystal, polymer network liquid crystal, polymer stabilized liquid crystal, liquid crystal displays and similar devices), comprising eutectic mixtures of dichroic metallomesogen molecules. The aforesaid metallomesogen molecules comprise chromophore groups synthesized by physical and chemical mixing methods.

11 Claims, 5 Drawing Sheets

(56) References Cited

OTHER PUBLICATIONS

Corresponding U.S. Appl. No. 15/524,297, filed May 4, 2017 (not published yet).
Non-Final Rejection Office Action issued for U.S. Appl. No. 14/255,260, dated Jul. 11, 2016.
Non-Final Rejection Office Action issued for U.S. Appl. No. 14/255,260, dated Jan. 4, 2016.
Restriction/Election Requirement Office Action issued for U.S. Appl. No. 14/255,260, dated Sep. 30, 2015.
Department of Defense, Military Specification—"Filter, Polarizing (for optical instruments)", MIL-F-21424A(OS), Jul. 31, 1975, pp. 3-7.
Wikipedia, "Dimmer", https://en.wikipedia.org/wiki/Dimmer, last edited Mar. 11, 2017.
International Preliminary Report on Patentability (Chapter I) for PCT/IL2011/000761, dated Apr. 2, 2013.
International Preliminary Report on Patentability (Chapter I) for PCT/IL2015/050543, dated Apr. 25, 2017.
International Preliminary Report on Patentability (Chapter I) for PCT/IL2015/051031, dated Apr. 25, 2017.
International Preliminary Report on Patentability (Chapter I) for PCT/IL2015/050461, dated Nov. 8, 2016.
International Preliminary Report on Patentability (Chapter II) for PCT/IL2015/051069, dated Nov. 25, 2016.
International Search Report for PCT/IL2011/000761, dated Jan. 19, 2012.
International Search Report for PCT/IL2015/051069, dated Apr. 7, 2016.
International Search Report for PCT/IL2015/051031, dated Jul. 1, 2016.
International Search Report for PCT/IL2015/05046, dated Nov. 2, 2015.
International Search Report for PCT/IL2015/050543, dated Dec. 18, 2015.
Okatani T. et al., "Study of image quality of superimposed projection using multiple projectors", IEEE Trans Image Process, vol. 18(2), Feb. 2009.
Response to Non-Final Rejection Office Action issued for U.S. Appl. No. 14/255,260, dated Jan. 4, 2016, as submitted on Mar. 31, 2016.
Response to Restriction/Election Requirement Office Action issued for U.S. Appl. No. 14/255,260, dated Sep. 30, 2015, as submitted on Nov. 29, 2015.
Written Opinion of International Search Authority for PCT/IL2011/000761, dated Jan. 19, 2012.
Written Opinion of International Search Authority for PCT/IL2015/051069, dated Apr. 7, 2016.
Written Opinion of International Search Authority for PCT/IL2015/051031, dated Jul. 1, 2016.
Written Opinion of International Search Authority for PCT/IL2015/050461, dated Nov. 2, 2015.
Written Opinion of International Search Authority for PCT/IL2015/050543, dated Dec. 18, 2015.

\* cited by examiner

METAL ORGANIC LIQUID CRYSTAL DYES

CROSS-REFERENCE TO RELATED APPLICATIONS

This application is a U.S. National Phase filing under 35 U.S.C. 371 of International (PCT) Patent Application No. PCT/IL2015/050543, filed 25 May 2015, which claims priority from U.S. Patent Application No. 62/065,805, filed 20 Oct. 2014, both of which are incorporated by reference in their entirety.

FIELD OF THE INVENTION

The present invention relates to liquid crystal devices, particularly polymer dispersed liquid crystal and, more specifically, to dye components.

BACKGROUND OF THE INVENTION

US patent application U.S. Pat. No. 5,843,333A discloses polymeric dispersed liquid crystal electro-optical device composites containing a polymeric continuous phase and a discontinuous liquid crystal phase comprising a metal-organic mesogen. The continuous phase is a thermosetting, or thermoplastic polymeric composition. The discontinuous phase may also contain a guest-host system consisting of organic liquid crystal hosts that are compatible with the dichroic metal-organic mesogen guest.

The transmittance spectra of metal-organic mesogen compositions are not uniform. In particular, in blue-near UV range, the dichroic metal-organic mesogen compositions have higher light transmittance. Hence, there is a long-felt and unmet need to provide metallomesogen compositions having controllable optical properties, in particular, switchable high absorption in UV and IR spectral ranges. Specifically, such metallomesogen compositions addable to existing liquid crystal host, polymer dispersed liquid crystal (PDLC), polymer network liquid crystal (PNLC), polymer stabilized liquid crystal (PSLC) or liquid crystal displays (LCD) compositions are needed for switchable windows, displays, panels and similar devices.

SUMMARY OF THE INVENTION

It is hence one object of the invention to disclose a dye composition, highly soluble and dispersible within the liquid crystal domains of a polymer dispersed liquid crystal (PDLC), polymer network liquid crystal (PNLC), polymer stabilized liquid crystal (PSLC) or liquid crystal displays (LCD), comprising of dichroic metallomesognen (MOM) components and/or their eutectic mixtures.

It is a core purpose of the invention to provide the molecules comprising MOM with chromophore groups.

Another object of the invention is to disclose the dye composition in a form of a eutectic mixture of MOM homologues.

A further object of the invention is to disclose a metal of said MOM selected from a group consisting of vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, the lanthanides, uranium and any combination thereof.

A further object of the invention is to disclose a MOM that is characterized by polycyclic structure containing one or more aromatic groups and a metallic moiety covalently-, ionically-, coordination complex bonded therewith.

A further object of the invention is to disclose the one or more of the aromatic groups which are heterocyclic structures containing unsaturation.

A further object of the invention is to disclose the aromatic structures which are part of a fused ring, and interbonded to another aromatic structure or to an alicyclic structure, through one or more of a covalent bond, polyfunctional organic groups including alkylene, alkenylene, alkylidene, alkenylidene, alkylidyne, alkynylidene, alkynylene, carbonvloxy ester, carbonylimino, azomethine, and inorgano polyfunctional groups including amino, azino, azo, azoxy, diazoamino, sulfide, disulfide, polysulfide, ether (oxy), keto, and diketo.

A further object of the invention is to disclose the metal-organic mesogen comprising a metal bonded multi-aromatic unit of at least two aromatic groups covalently joined, either directly or through other polyvalent organic or inorganic connecting groups.

A further object of the invention is to disclose the metallomesogen characterized by the following formula:

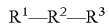

where $R^1$ and $R^3$ are the same or different moieties, each of which provides at least one covalently joined aromatic group and $R^2$ contains a polyvalent metal, bonded to $R^1$ and $R^3$ by covalent ionic or weaker bonding forces.

A further object of the invention is to disclose the $R^2$ containing a ring atom of a saturated structure or an unsaturated heterocyclic structure and thus constitutes part of the aromaticity of the composition.

A further object of the invention is to disclose the presence of chromophore groups, including but not limited to $NO_2$, $CN$, $C_nH_{2n-1}$ (where n can be between 1 and 12), $OC_nH_{2n-1}$ (where n can be between 1 and 12), $O(CH2CH2)_n$ OCH3 or $O(CH2CH2)_n$OCH2CH3 (where n can be between 1 and 3), $C_nH_{2n-1}$(C6H4)COO (where n can be between 1 and 12), $OC_nH_{2n-1}$(C6H4)COO (where n can be between 1 and 12), $O(CH2CH2)_n$OCH3(C6H4)COO or $O(CH2CH2)_n$OCH2CH3(C6H4)COO (where n can be between 1 and 3).

A further object of the invention is to disclose the method of synthesizing MOM-chromophores dyes by chemical mixing.

BRIEF DESCRIPTION OF THE DRAWINGS

The invention will now be described with reference to the drawings, wherein.

DETAILED DESCRIPTION OF THE INVENTION

Figure 1:
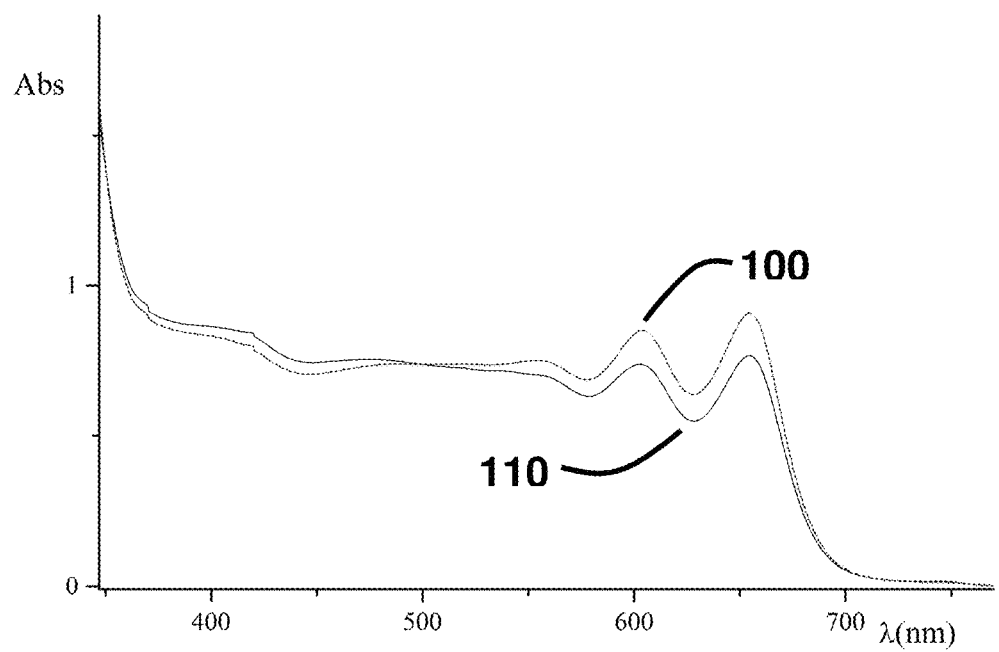
FIG. 1 presents absorption spectra of a black metallomesogen dye, both as prepared and after two months of aging under sunlight.

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a dichroic dye composition comprising metallomesogen (MOM) molecules. These MOM have been modified by the addition of chromophore groups. Thus, a novel dye composition has been obtained. This composition is added to liquid crystal devices, thereby providing a film with the following properties: switchable UV and IR transmittance and absorption.

According to the present invention, optical properties of dichroic MOM dye are modifiable by means of introducing chromophore groups into the composition. The chromophore groups absorb certain wavelengths of and transmit or reflect others. The chromophore groups have two molecular orbitals differing from each other by photon energy within the range of the UV-visible-near IR spectrum.

The structure of the organometallic liquid crystal compound comprise a metal bonded multi-aromatic unit of at least two aromatic groups covalently joined, either directly or through other polyvalent organic or inorganic connecting groups. Generally, there are at least two multi-aromatic units bonded to the metal. Illustrative of such a structure is the following:

$$R^1—R^2—R^3 \quad (1)$$

where R$^1$ and R$^3$ are the same or different moieties, each of which provides at least one covalently joined aromatic group (aromatic groups include the unsaturated heterocyclic structures), and R$^2$ contains a polyvalent metal, bonded to R$^1$ and R$^3$ by covalent, ionic or weaker bonding forces. R$^2$ may contain a ring atom of a saturated structure or an unsaturated heterocyclic structure and thus constitutes part of the aromaticity of the composition.

The metals included are vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, rare earth metals, or uranium, and the like. The compound (1) may be an anionic or cationic component of a salt in which the counter-ion is a structure that does not adversely affect the liquid crystal properties of compound (1) or combines with compound (1) to provide the liquid crystal properties. Particularly preferred organometallic liquid crystal compositions useable in the practice of this invention comprise those of the formula:

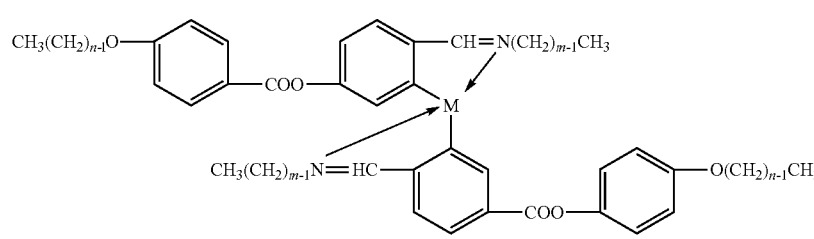

(2A)

in which M is copper, nickel, vanadyloxide and palladium and n and m are positive numbers such that compound (2) is a liquid crystal, and preferably nematogenic. In general, n and m each have a value of 2 to about 15, sufficient that the compound is mesogenic, preferably such that the compound possesses enantiotropic, monotropic, smectic, nematic and/or cholesteric phases. These compositions are described by Caruso, et al., Liquid Crystals, 1990, vol. 7, no. 3, pp. 421-430 and Liquid Crystals, 1991, vol. 10, no. 1, pp. 85-93.

Similar mesogens have the following formulae:

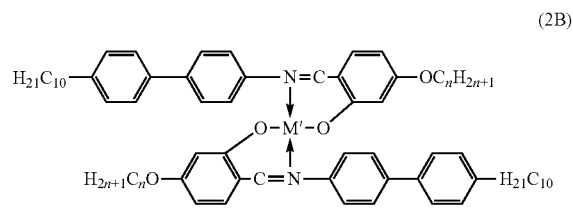

(2B)

where n is defined above, and M' is oxyvanadium and platinum. See Sadashiva, et al., Abstract, International LCC, Pisa, Italy, 1992, A-P16, p. 38.

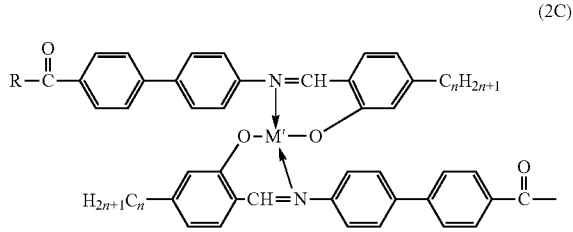

(2C)

where R is organo such a aryl, alkyl, alkoxyaryl and the like, and n is defined above. M is defined above, and is preferably copper.

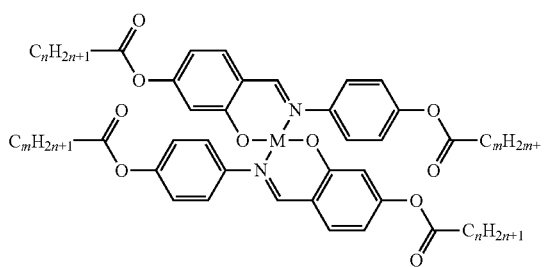

(2D)

Another compound is described by Giroud-Godquin and Maitlis, supra, at pages 394-395, of the formula:

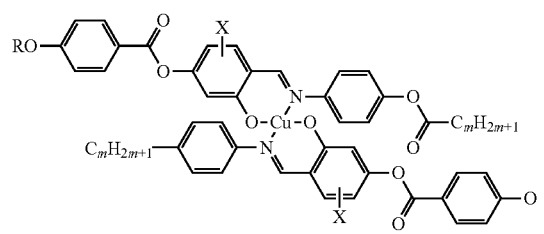

(2E)

where R is alkyl ($C_{1-20}$)) m is 1-20, and X is alkyl ($C_{1-4}$). Similar compounds are described by Giroud-Godquin and Maitlis, supra, at pages 395-396, of the formulae:

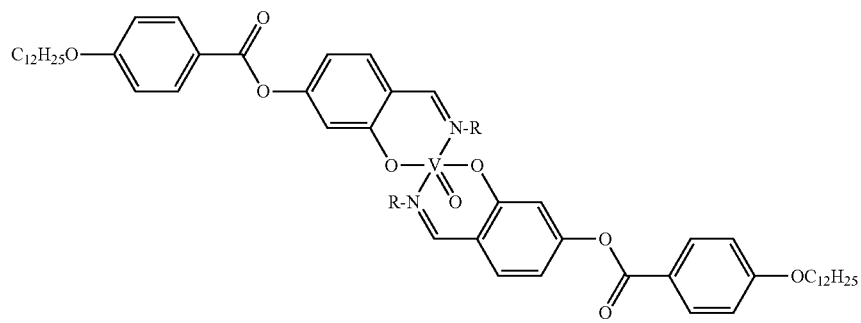

(2F)

and

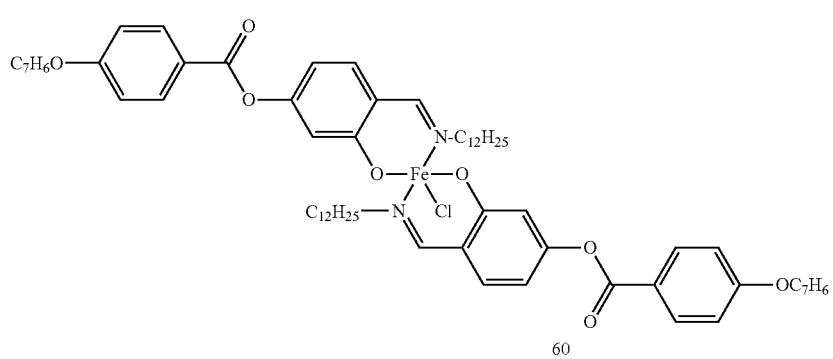

(2G)

and

In summary of the compounds of formula (2), M is copper, nickel, vanadyloxide and palladium and n and m are positive numbers of a value such that the compound is a liquid crystal, M' is oxyvanadium and platinum, R is aryl, alkyl and alkoxyaryl and X is alkyl.

Another preferred organometallic liquid crystal compositions useable in the practice of this invention relates to a class of liquid crystal compounds formed by ionic interaction of mesogenic cations with mesogenic anions. Either may contain a metal. One type can be represented by the general formula $$L_2MX2 \qquad (3)$$

where L represents an organo-nitrogen mesogen, M is defined above, X represents halide. (See Maitliss, et al. WO87/02693, Publ'd: May 7, 1987) Preferred embodiments of compounds (3) are obtained when the metal is palladium or platinum. Another organometallic mesogens suitable in practicing the invention are those represented by the general formulae:

$$LRh(CO)_2X \qquad (4)$$

$$LAuX \qquad (5)$$

where L and X are defined above (see Bruce, et al., J. Chem. Soc, Chem. Comm., 1985, 581; Adams, et al., Liquid Crystal, 1987, 2, 38). Other suitable ionic mesogens are encompassed by the formulae:

$$[L_2Ag]^+BF_4 \qquad (6)$$

$$[L_2Ag]^+Y \qquad (7)$$

$$X^+Y- \qquad (8)$$

where L is as defined above, Y– is a mesogenic anion and $X^+$ is a mesogenic cation. Another class of organometallic mesomorphic compound is represented by the formula $$[(R^4COO)_4M2] \qquad (9)$$

where $R^4$ represents an alkyl or aryl group, for example $C_{11}H_23$ and M is as defined above. Methods for making these organometallic mesogens are described by Maitliss, et al. WO87/02693, published May 7, 1987.

An additional class of preferred organometallic liquid crystal compounds is complexes of the formula:

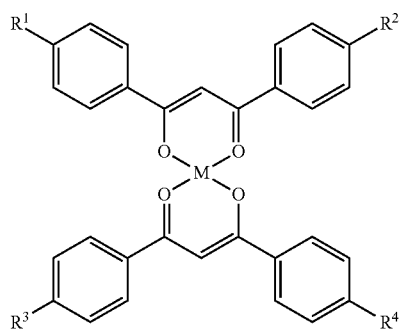

(10A)

where $R^{1-4}$ are the same or different alkyl ($C_{1-30}$, alkoxy ($C_{1-30}$), aryloxy or cyano groups, and M is described above. A description of these compounds is set forth in, Chemical Abstracts, 97:6461k and by Giroud-Godquin in French Patent 2,486,946. The same author, (CA, 91:177447F) and French Patent 2,393,839, describes compounds of the formula:

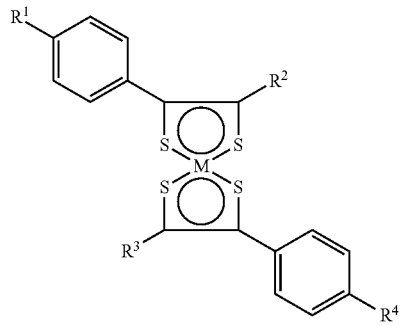

(10B)

where $R^{1,4}$ are the same or different alkyl ($C_{1-14}$), alkoxy ($C_{1-14}$) or aryl groups, $R^{2,3}$ are hydrogen or the same or different alkyl ($C_{1-4}$) groups and M is described above where R is alkyl, alkoxy or aryl, R' is H or alkyl, M is described above, preferably platinum, cobalt or vanadium. In that same family of compounds is the mesomorphic transition metal complexes of the formulae:

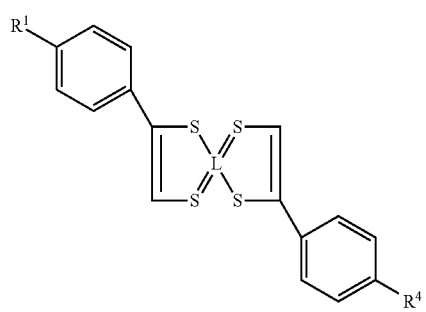

(10C)

(10D)

where $R^{1,4}$ and M are defined above. See Bruce, et al., J. Mater. Chem., 1991, 1(5), 857-861.

Another class of desirable organometallic mesogens for use in the practice of the invention, has the formula:

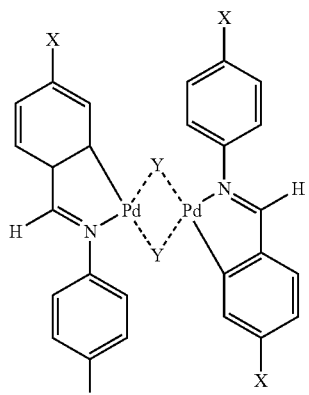

(11A)

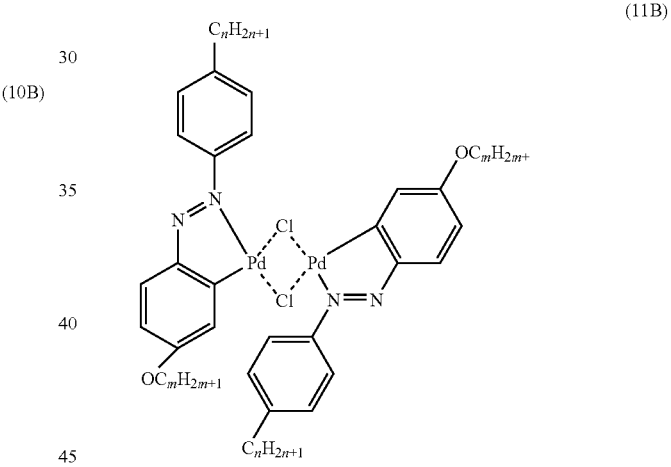

(11B)

where Y is halogen, preferably chlorine, X is hydrogen, alkyl ($C_{1-14}$), alkoxy ($C_{1-14}$), halogen (preferably chlorine, bromine or iodine), cyano, nitro, and the like, and X' is alkyl ($C_{1-14}$) or alkoxy ($C_{1-14}$). These compounds are generally described in Ros, et al., Liquid Crystal, 1991, vol. 9, no. 1, 77-86, and Ghedini, et al., MATERIALS, 1992, 4, pp. 1119-1123.

Also included are the benzenedithiol metal complex of the formula:

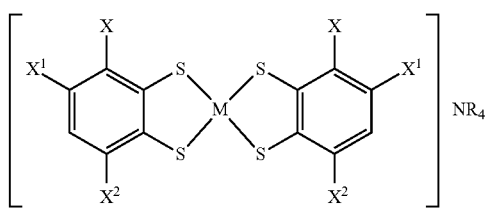

(12)

where M is Ni, Pd or Pt, X is Cl or Br, X— and $X^2$ are H or Cl when X is Cl and H' or Br when X is Br, and R is $C_{1-14}$ alkyl. See Saito, et al., CA, 105: 2168 Hz and U.S. Pat. No. 4,508,655.

Illustrative of specific versions of compounds (2) are:

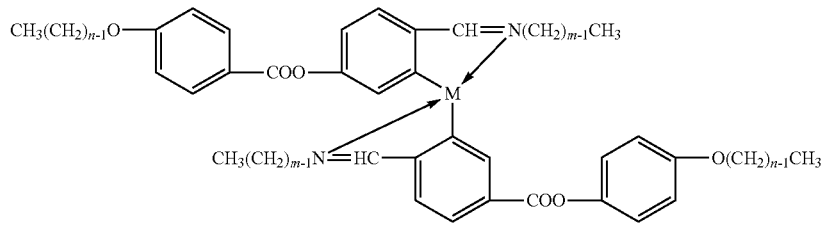

where

| M= | n | m |
|---|---|---|
| Cu(II) | 6 | 1-15, 17 |
| Cu(II) | 10 | 1-15, 17 |
| Cu(II) | 7-14 | 8 |
| Cu(II) | 7-14 | 13 |
| Pd(II) | 8-11, 14 | 1 |
| Pd(II) | 7 | 13 |
| Pd(II) | 8 | 8, 13 |
| Pd(II) | 14 | 3 |
| Ni(II) | 8, 11, 14 | 1 |
| Ni(II) | 12 | 13 |

Specific illustrations of compounds (3)-(9) are the following:
1. bis (4-carbonitrile-4'-nonyloxybiphenyl) dichloropalladium
2. bis (4-carbonitrile-4'-octylbiphenyl) dichloroplatinum orange cis-dicarbonyl (4-carbonitrile-4'-nonyloxybiphenyl) chlororhodium 3. yellow bis(4-butoxy-4'-stilbazole) silver tetrafluoroborate
4. $[Mo_2(C_{12}H_{21}O_2)_4]$
5. green-blue complex $[Rh_2(C_{12}H_{21}O_2)_4]$
6. $X^+=[Me_3NC_{16}H_{33}]^+$, $Y^-=[SO_4C_{12}H_{25}]^-$
7. Bis(4-carbonitrile-4'-pentylbiphenyl)dichloropalladium
8. Bis(4-carbonitrile-4'-nonyloxybiphenyl)dichloropalladium (melts to give a mesophase at 119° C. which persists until an isotropic liquid is present at 147° C. On cooling from the isotropic liquid, a nematic phase is formed and the material is totally nematic at 130° C.)

where $R^x$ and $R^y$ are the same or different alkyl ($C_{1-18}$), $R^y$ may be hydrogen, halogen, such as fluorine, chlorine, bromine and iodine, aryl such as phenyl, aroxy such as phenoxy, and $M_1$ is iridium or rhodium. For example, $R^y$ may be hydrogen, $R^x$ may be n-pentyl, and $M_1$ may be iridium.

9. Bis(4-carbonitrile-4'-octylbiphenyl)dichloroplatinum (melts to give a nematic phase at 170° C. which turns into an isotropic fluid at 190° C.)

10. The complex cis-dicarbonyl-(4-carbonitrile-4'-nonyloxybiphenyl)chlororhodium (melts to give a nematic phase at 52° C. which turns into an isotropic liquid at 80° C.)

11. The complex bis(4-butoxy-4'-stilbazole) silver tetrafluoroborate (melts at 180° C. to a smectic phase which on heating to 305° C. becomes an isotropic liquid.)

12. Mixtures of $(C_3H_7C_6H_{10}C_6H_{10}CN)$ chloro palladium and $(C_5H_{11}C_6H_{10}C_6H_{10}CN)$ chloro palladium (shows enantiotropic nematic phases whereas the second component only shows a monotropic nematic phase).

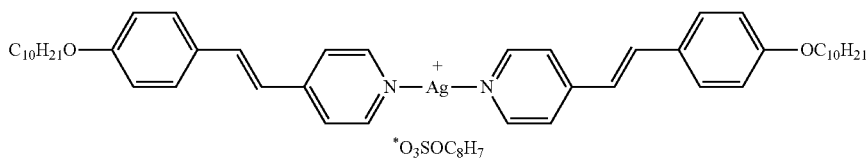

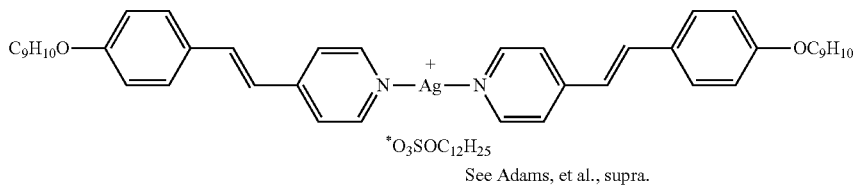

See Adams, et al., supra.

14. Illustrative of mesomorphic stilbazole complexes of rhodium and iridium are the following compound:

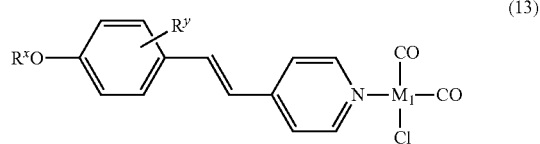

(13)

The following compounds are illustrative of formula (11) compositions:
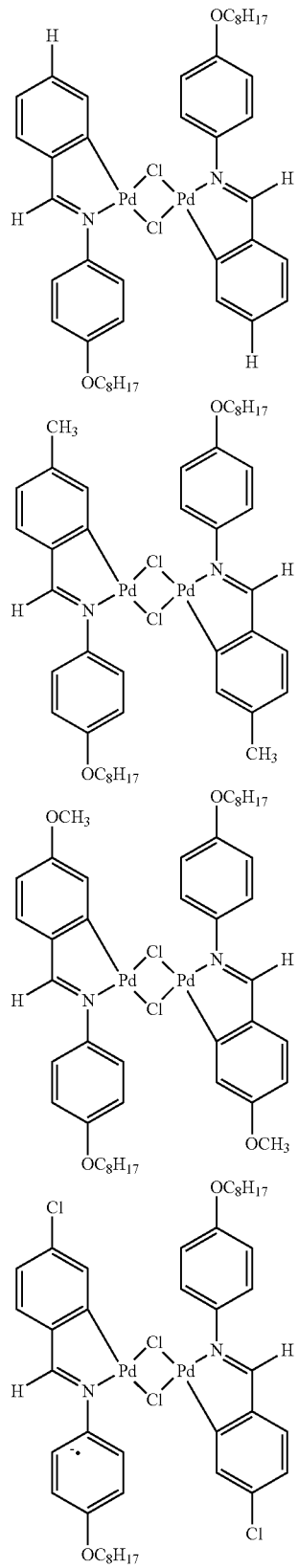
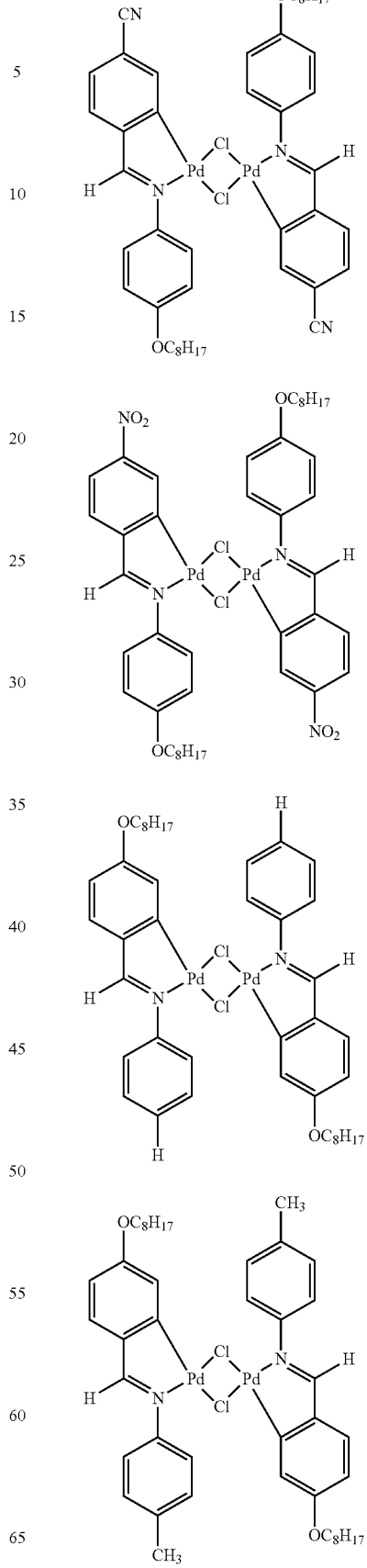

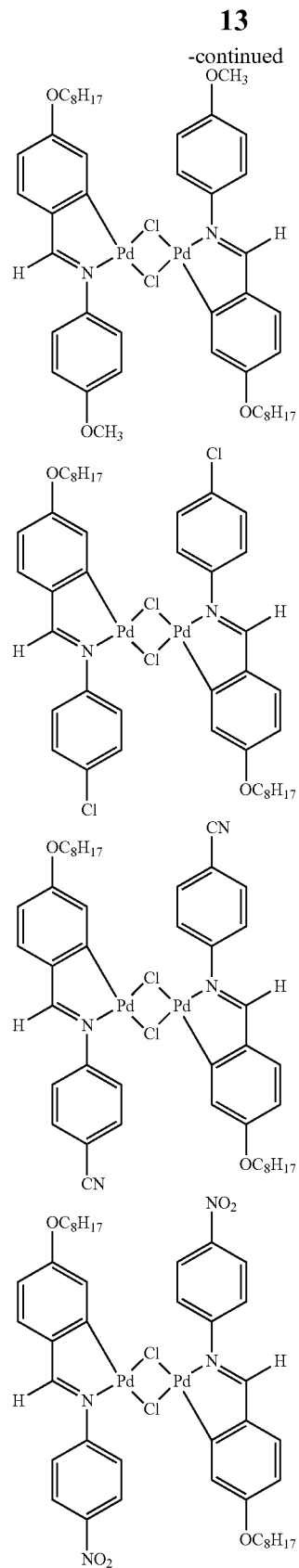

Giroud-Godquin and Maitlis, supra, at pages 397 and 398, describe another useful class of organometallic liquid crystal compounds suitably employable in the practice of the invention. One class is characterized by the formula:

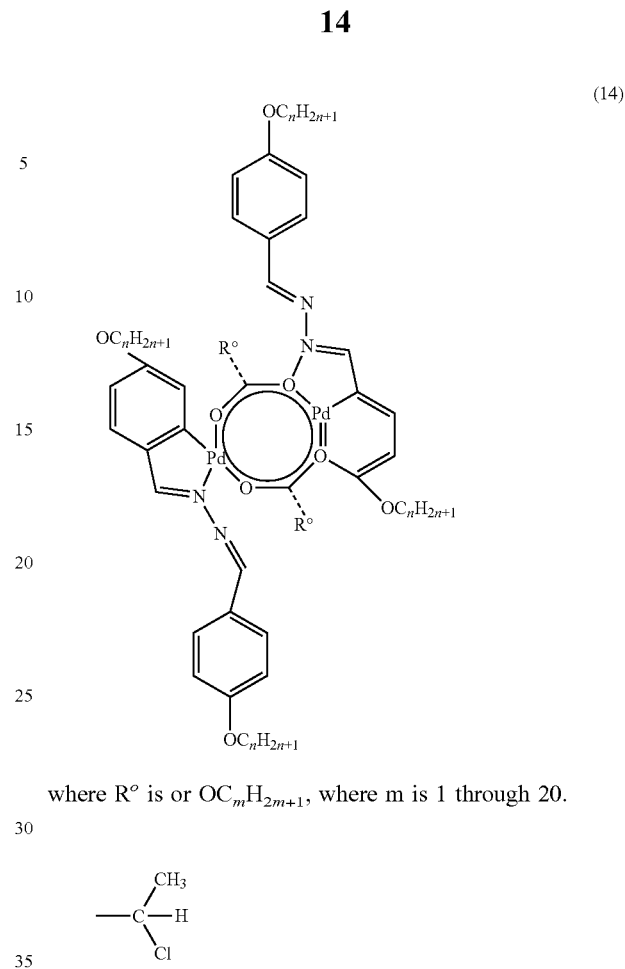

where $R^{\circ}$ is or $OC_mH_{2m+1}$, where m is 1 through 20.

$$\begin{array}{c} CH_3 \\ | \\ -C-H \\ | \\ Cl \end{array}$$

Another series of MOMs are described by Versace et al., Mol. Cryst. Liq. Cryst. 1992, vol. 212, pp. 313-318, having the formulae:

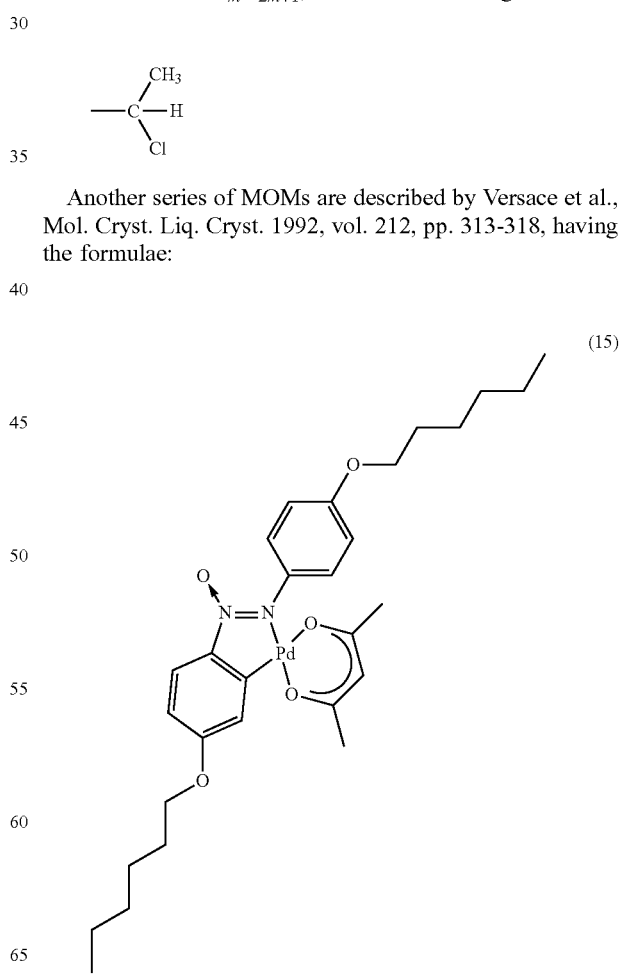

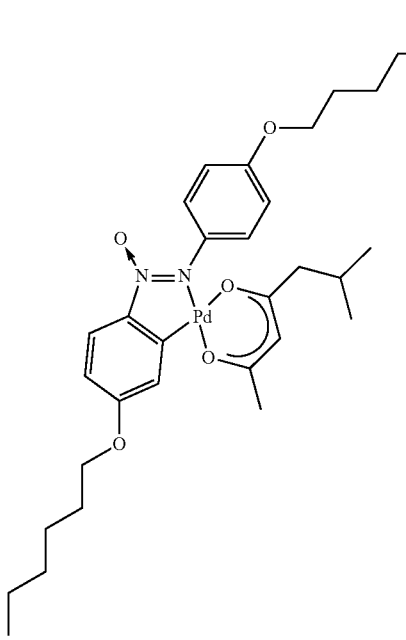

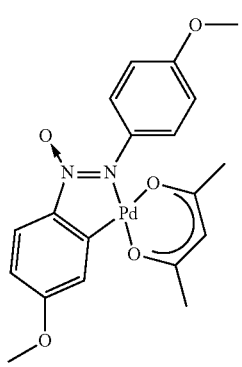

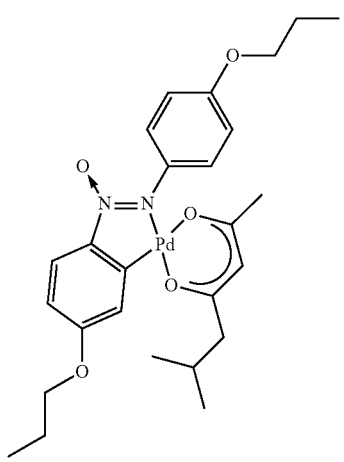

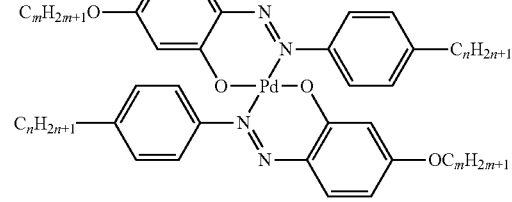

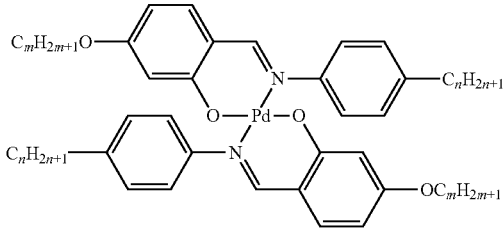

where n and m are whole numbers having a value of 1-20.

Another series of MOM's are copper complexes of phenacyl pyridines having the formula:

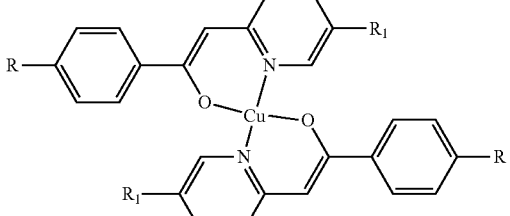

where R and $R_1$ may be the same or different, and each of R and $R_1$ may be H, —$OC_8H_{17}$, or —$OC_6H_{13}$.

These complexes are synthesized by preparing a solution of 0.2 mmol of free phenacyl pyridine ligand in 4 ml of mixture of acetone/DMF and refluxing for 0.5 hour. 0.4 mmol of solid copper (II) acetate monohydrate is then added and the reaction mixture is refluxed for two hours. Upon cooling, brown crystals appear from the solution. The crystals are separated by filtration and washed with cold acetone.

Where R and $R_1$ are both H, the resultant copper (II) complex is Copper (II) 2 (phenacyl pyridine). Where R is —$OC_8H_{17}$ and $R_1$ is H, the resultant complex is Copper (II) 2-phenacyl-5-octyloxypyridine. Where both R and $R_1$ are —$OC_8H_{17}$, the resultant complex is Copper (II) 2-(4-octyloxyphenacyl)-5-octyloxypyridine. Where both R and $R_1$ are —$OC_6H_{13}$, the resultant complex is Copper (II) 2-(4-hexyloxyphenacyl)-5-hexyloxypyridine.

Mixtures of these copper complexes of phenacyl pyridines may be prepared for use in the polymer dispersed liquid crystal composites of the present invention. The mixtures may comprise up to 100% of the liquid crystal discontinuous phase of the polymer dispersed liquid crystal composite, such mixtures containing no non-metallic organo liquid crystal.

Mixtures of these copper complexes may also be prepared which include non-copper complexed ligands. The presence of the non-complexed ligands in such mixtures increases markedly the solubility of the copper complexes. The copper complex/ligand mixtures may comprise up to 100% of the discontinuous liquid crystal phase of the polymer composites of the present invention. Eutectic mixtures of these complexes may be prepared (see Examples).

Another class of MOMs suitable for use in the polymer dispersed liquid crystal composite of the present invention are these of Cholesteric (chiral nematics) where the aliphatic group(s) of the chemical structures contain one or more asymectric carbons. The existence of a chiral group in the nematic forming compounds can result in a helicoidal structure in the mesophase. This helicoidal long range effect is identified with a twist or "pitch" factor, which can be measured optically or spectroscopically. If the "pitch" of the cholesteric structure falls within the visible range of the wavelength of light, it reflects the color associated with the "pitch" length, and the phase will be colored. The "pitch" is affected by a number of factors; mostly the "concentration" and the temperature. Addition of either cholesteric (chiral nematic) MOM's, their ligands or other non-mesogenic solutes with chiral group to a nematic liquid crystal compound or mixture (including nematic MOM's) may create a "cholesteric" phase with a reflective color associated with the "pitch" of the cholesteric mixtures.

The use of "cholesteric" MOM's can provide the possibility of color matching in the mixtures of MOM's or with liquid crystals, where the "absorption" colors due to the metal-complex can be combined and/or matched with that of the "reflection" colors due to cholesteric pitch for a vast range of application in liquid crystal display technology. Descriptions of such cholesteric/chiral nematic MOM's may be found in M. Ghedini et al., Liq. Cryst., Vol. 15, 33 1 (1993); and M. Ghedini et al., Chem. Mater. 5, 883 (1993). Such cholesteric/chiral nematic compounds may be compounds of the following formulae:

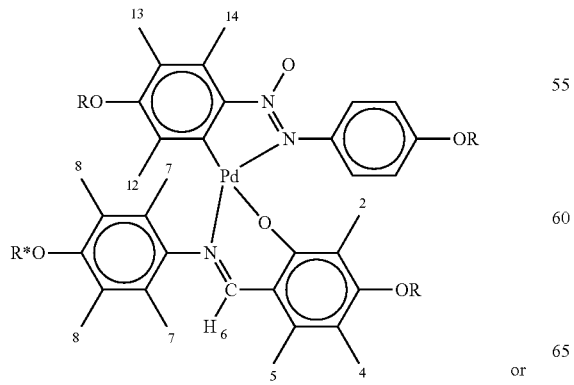

(22)

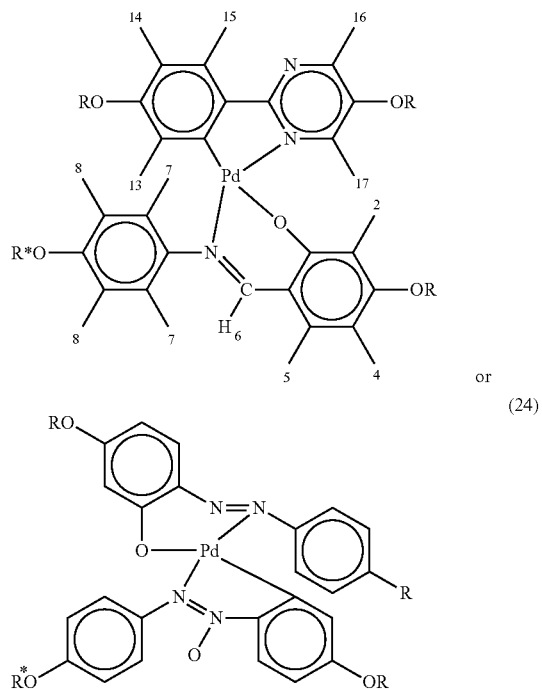

(23)

(24)

where R is $CH_3(CH_2)_m-$, where m=1-20, and where R* is $$CH_3(CH_2)_n CH(CH_2)_{p^-},$$
$$\phantom{CH_3(CH_2)_n}|$$
$$\phantom{CH_3(CH_2)_n}CH_3$$

where n and p=1-10.

A description of the synthesis of the palladium complexes of the general formula 24 may be found in Italian patent application VE92A000003.

Other metal-organic liquid crystal compounds suitable for use in the present invention include compounds of the formulae:

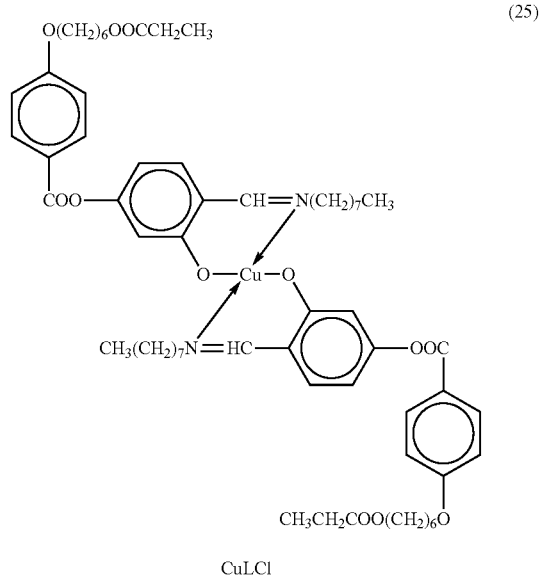

(25)

-continued (26)

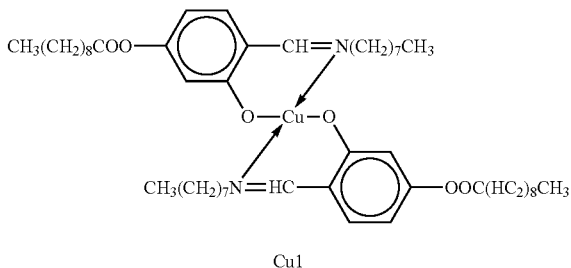

Cu1

The synthesis of Cu-1 is described in Caruso et al., Macromolecules 24, p. 2606 (1991). CuLCl may be synthesized as follows. 3.92 g of the following compound,

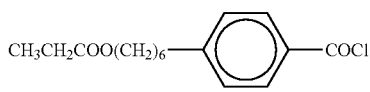

the synthesis of which is described in Caruso et al., Macromolecules 24, p. 2606 (1991), are dissolved in 80 mL dehydrated chloroform and reacted with 3.33 g of the following compound, also described in the above reference:

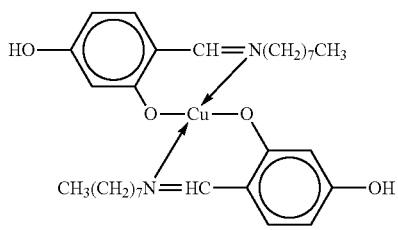

together with 1.92 g of tetrabutylammonium hydrogensulphate and 1.24 g KOH dissolved in 150 mL water. The reaction is performed in a blender for 10 min. The chloroformic phase is then treated several times with water, dried and evaporated to 30 mL volume. Crystallization of CuLC 1 is obtained after addition of 150 mL ethanol. Yield: 4.49 g (90%).

Another metal-organic mesogen suitable for use in the polymer dispersed liquid crystal composites of the present invention includes compounds having the formula:

(27)

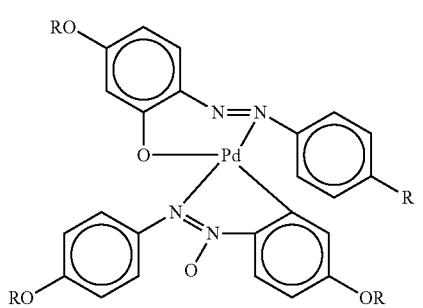

where R is $CH_3(CH_2)_m$—, where m=1-20 These compounds are described in Italian patent application VE92A00003.

The invention also contemplates the use of polymeric forms of the aforementioned types of MOMs, such as characterized by Giroud-Godquin and Maitlis, supra, at page 396 (section 7.3).

As should be apparent to those working in this art, the difference in physical properties of the MOMs as compared to the non-metal containing liquid crystal traditionally used in polymer dispersed liquid crystal composites, provides a mechanism of control over the kinetics of phase separation and resin curing to vary and particularly to improve the contrast ratio (transparency/opacity) of polymer dispersed liquid crystal films by controlling (i) the solubility of liquid crystal in the resin, (ii) the rate of droplet formation, (iii) controlling the rate of polymer solidification, and (iv) controlling the liquid crystal droplet morphology (size, density). This is especially the case where MOMs are used in conjunction with conventional, non-metallic liquid crystals in the polymer dispersed liquid crystal composite.

In the preferred embodiment of the invention, the organometallic liquid crystal is used in combination with another compatible liquid crystal composition that is non-metallic. Preferably, these other liquid crystals are of the nematic form or operationally nematic which means that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. More preferably, they also have a positive dielectric anisotropy.

In another preferred embodiment of the invention, the organometallic liquid crystal comprises 100% of the liquid crystal discontinuous phase. In these embodiments, mixtures of compatible organometallic liquid crystals are employed. Such mixtures may be eutectic mixtures of organometallic liquid crystals. In still other embodiments, mixtures (including eutectic mixtures) of organometallic liquid crystals and their ligands are employed. The inclusion of the ligands of the organometallic liquid crystals in mixtures of the organometallic liquid crystals may improve the solubility of the organometallic liquid crystals.

Where the organometallic liquid crystals are uses in combination with non-organometallic liquid crystals, the organometallic liquid crystals should be compatible with the non-organometallic liquid crystals. Preferably, the organometallic liquid crystals should be soluble in the non-organometallic liquid crystals. The combination of the metallo organic mesogens and the conventional liquid crystals generally form a eutectic melting mixture. This is noted by the increase of the liquid crystal mixture's increase in $T_{ni}$. Suitable nematic liquid crystals in compositions typically contain a linear chain of at least one, preferably at least two, aromatic group preferably phenylene or heterocyclic aromatic groups, connected to a linking group such as a covalent bond, a carbonyloxy group, a vinylene group (—CH=CH—), a carbonylimino group, an ethynylene group (—C≡C—), an azomethine group (—CH=N—), an azo group (—N=N—), an azoxy group, and the like. Preferred non-metallic liquid crystals comprise cyanobiphenyls, and may be mixed with cyanoterphenyls and with various esters.

Typical organic classes of liquid crystal forming materials contemplated comprise both aromatic and aliphatic organic compounds such as benzylideneanilines generally prepared from the reaction of para-substituted benzaldehyde and parasubstituted aniline; N-(p-alkoxybenzylidene)-p-aminostyrenes prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted bibenzyls; p,p'-disubstituted stilbenes; p,p'-disubstituted diphenylacetylenes; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds include ethyl p-4-ethoxy-benzylideneaminocinnamate; p,p'-azoxybenzoic acid diethyl ester; N-(p-methoxybenzylidene)-p-aminostyrene; N-(p-butoxybenzylidene)-p-aminostyrene; p-azoxyanisole; p-hexyloxybenzalazine; p-azoxyphenetole; p-anisylidene-p-biphenylamine; p-ethoxy-benzylindene-p-biphenylamine; p-anisylidene-p-aminophenyl acetate; p-ethoxybenzylidene-p-aminophenyl acetate; p-n-hexyloxy-benzylidene-p-aminophenyl acetate; p-n-hexoloxybenzylidene-p-aminophenyl acetate; deca-2,4-dienoic acid; 4,4' di-n-heptoxyazoxybenzene; 4,4' di-n-hexoxyazoxybenzene; 4,4' di-n-hexoxyazoxybenzene; 4,4' di-n-pentoxyazoxybenzene; 4,4' di-n-butoxyazoxybenzene; 4,4'diethoxy-azoxybenzene; undeca-2,4-dienoic acid; nona-2,4-dienoic acid; 4,4' dimethoxystilbene; 2,5-di(p-ethoxybenzylidene)cyclopentanone;

2,7-di-(benzylideneamino) fluorene; 2-p-methoxybenzylideneaminophenanthrene; 4-methoxy-4"-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinnamic acid; 6-methoxy-2-naphtholic acid; p-phenylene di-p-anisate; p-phenylene di-p-ethoxybenzoate; p-phenylene di-p-n-hexyloxybenzoate; p-phenylene di-p-n-heptyloxybenzoate; p-phenylene di-p-n-octyloxybenzoate; 1,4-bicyclo [2.2.2.] octylenedi-p-anisate; 1,4-bicyclo [2.2.2]octylene di-p-n-octyloxybenzoate; trans-1,4-cyclohexylene di-p-n-butoxybenzoate; 4,4'-di(p-methoxybenzylideneamino)dibenzyl; p,p'-diacetoxystilbene; 1,2-di(p-methoxyphenyl)-acetylene; p-(p-acetoxyazo) benzoic acid; 1,4-di-(p-methoxyphenyl)-butadiene; p-anisal-p-anisidine; p,p'dimethoxydibenzal-1,4-naphthalenediamine; p-n-butylbenzoic acid; p,p'-di-n-butyldiphenylpyridazine; p-(p-cyanobenzal) anisdine; p-(p-methoxybenzoxy benzoic acid, anisal-p-aminozobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene) benzidine; p-bis-(heptyloxybenzoyloxy)benzene; p-n-propoxybenzoic acid; p-n-butoxybenzoic acid; p-n-amyloxybenzoic acid; p-n-hexyloxybenzoic acid; p-n-heptyloxybenzoic acid; p-n-octyloxybenzoic acid; butyl-p-(p-ethoxyphenoxycarbonyl) phenylcarbonate; p-(p-ethoxy-phenylazo)-phenylheptanoate; 4-[(p-hexyloxycarbonyloxybenzylidene) amino]-1-pentyloxybenzene; N-p-(pentyloxycarbonyloxy) benzylidene]-p-anisidine; p-[(p-butoxyphenyl)azo[phenyl butyl carbonate; p-(p-ethoxyphenylazo)phenyl hexanoate; p-(p-ethoxy-phenylazo)phenyl valerate; p-[(p-ethoxybenzylidene)amino]benzonitrile; p-[(p)-methoxybenzylidene) amono[benzonitrile; ethyl p-[(p)-methoxybenzylidene) amino[cinnamate; p-(p-ethoxyphenylazo)-phenyl crotonate; p-Rp-methoxybenzylidene)amino]-phenyl p-toluate; p-Rp-methoxybenzylidene)amino]-phenylbenzoate; p-[(p-ethoxybenzylidene)amino]phenylbenzoate; N,N'-di(p-methoxybenzylidene)α,α'-biptoluidine; p-anisalazine; 4-acetoxy-3-methoxycinnamic acid; p-acetoxycinnamic acid; 4'-Rp-pentyloxycarbonyloxybenzylidene)aminovalerophenone; diethyl p,p'-azoxydicinnamate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4'-aminoacetophenone; 4-methoxybenzylidene-4'-aminoacetophenone; 4-nonyloxybenzylidene-4'-aminoacetophenone; 4-octyloxybenzlidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-hexyloxybenzylidene-4'-aminopropiophenone; 4-methoxybenzylidene-4'-aminopropiophenone; 4-nonyloxybenzylidene-4'-aminopropiophenone; 4-octyloxybenzylidene-4'-aminopropiophenone; 4-pentyloxybenzylidene-4'-aminopropiophenone; 4-propoxybenzylidene-4'-aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene)-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine, bis-(4-n-decyloxybenzylidene)-1,4-phenylenediamine; bis-(4-n-dodecyloxybenzylidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxybenzylidene)-1,4-phenylenediamine; bis-(4-n-pentyloxybenzylidene)-1,4-phenylenediamine; terephthal-bis-(p-bromoaniline); terephthal-bis-(p-chloroaniline); terephathal-bis-(p-fluoroaniline); terephthal-bis-(p-iodoaniline), and the like.

Nematic liquid crystalline materials suitable for use with the organometallic liquid crystals include: p-azoxyanisole, p-azoxyphenetole, p-butoxybenzoic acid, p-methoxy-cinnamic acid, butyl-p-anisylidene-p-aminocinnamate, anisylidene p-amino-phenylacetate, p-ethoxy-benzalamino-a-methyl-cinnamic acid, 1,4-bis(p-ethoxybenzylidene) cyclohexanone, 4,4'-dihexyloxybenzene, 4,4'-diheptyloxybenzene, anisal-p-aminoazo-benzene, anisaldazine, α-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylidene-p'-aminophenylpeatoate and mixtures thereof. Conjugated cyano-organic compounds that are useful are 7, 7', 8, 8'-tetracyanoquinodimethane (TCNQ), (2,4,7,-trinitro-9-fluorenylidene)-malono-nitrile (TFM), p-[N-(p'-methoxybenzylidene)amino]-n-butylbenzene (MBBA), p-[N-(p'-ethoxybenzylidene)amino]-butylbenzene (EBBA), p-[N-(p'-methoxybenzylidene)amino]phenyl butyrate n-butyl-p-(p'-ethoxyphenoxycarbonyl)phenylcarbonate, p-methoxy-p'-n-butylazoxybenzene, p-ethoxy-p'-n-butylazobenzene, p-[N-(p'-methoxybenzylidene)amino] benzonitrile (BBCA), p-[N-(p'-hexylbenzylidene)amino] benzonitrile (HBCA), pentylphenyknethoxy benzoate, pentylphenylpentyloxy benzoate, cyanophenylpentyl benzoate, cyanophenylpentyl benzoate, cyanophenylpentyloxy benzoate, cyanophenylheptyloxy benzoate, cyanophenyloctyloxy benzoate, cyanophenylinethoxy benzoate, and the like.

Desirable nematic liquid crystals frequently comprise cyanobiphenyls, and may be mixed with cyanoterphenyls and with various esters. There are commercially available nematic type liquid crystal mixtures, such as liquid crystal mixture "E7" (Licrilite® BL0O1 from E. Merck, Darmstadt, Germany, or its subsidiaries such as EM Industries, Hawthorne, N.Y. and Merck Industrial Chemical, Poole, England) that is a mixture of (by weight), 51% 4'-n-pentyl-n-cyanobiphenyl (5CB), 21% 4'-n-heptyl-n-cyanobiphenyl (7CB), 16% 4'-n-octoxy-4-cyanobiphenyl, 12% and 4'-n-pentyl-4-cyanoterphenyl that has a crystal to nematic liquid crystal phase transition temperature of −10° C. and a liquid crystal to isotropic phase transition temperature of 60.5° C. Illustrative of other such commercial liquid crystal mixtures are the following:

E-31 is a proprietary mixture of cyanobiphenyls and a non-cyano biphenyl ester available from E. Merck, supra, and having a crystal to nematic crystal phase transition temperature of −9° C. and a liquid crystal to isotropic phase transition temperature of 61.5° C. E-44 is a proprietary mixture of cyanobiphenyls, a cyanoterphenyl and a non-cyano biphenyl ester available from E. Merck, supra, and having a crystal to nematic liquid crystal phase transition temperature of −60° C. and a liquid crystal to isotropic phase transition temperature of 100° C. E63, from E. Merck, supra, is a liquid crystal mixture that is similar to the E7 with added cyclohexanes. It contains: significant amounts of the commonly known liquid crystal component SCB, 7CB, lesser amounts of SCT, lesser amounts of Benzonitrile,4-(4 propyl-1-cyclohexen-1-yl), commonly known as PCH3, lesser amounts of 4-carbonitrile,4'(4-pentyl-1-cyclohexen-1-yl)-1, 1'-biphenyl, commonly known as BCH5, and still lesser amounts of [1,1'-Biphenyl]-4-carboxylie acid, 4'heptyl-4'-cyano[1, 1'-biphenyl]-4-yl ester, commonly known as DB71. K-12 is 4-cyano-4'-butylbiphenyl and has a crystal to nematic liquid crystal phase transition temperature of 48° C. K-18 is 4-cyano-4'-hexylbiphenyl and has a crystal to nematic liquid crystal phase transition temperature of 14.5° C. and a liquid crystal to isotropic phase transition temperature of 29° C. K-21 is 4-cyano-4'-heptylbiphenyl and has a crystal to nematic liquid crystal phase transition temperature of 30° C. K-24 is 4-cyano-4'-octylbiphenyl and has a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C. M-15 is 4-cyano-4'-pentoxybiphenyl and has a crystal to nematic liquid crystal phase transition temperature of 48° C. and a liquid crystal to isotropic phase transition temperature of 68° C. M-18 is 4-cyano-4'-hexoxybiphenyl and has a crystal to nematic liquid crystal phase transition temperature of 57° C. and a liquid crystal to isotropic phase transition temperature of 75.5° C. M-24 is 4-cyano-4'-octoxybiphenyl and has a crystal to smectic A liquid crystal phase transition temperature of 54.5° C., a smectic A to nematic liquid crystal phase transition temperature of 67.0° C. and a nematic to isotropic phase transition temperature of 80.0° C. Other desirable Licrilite® liquid crystal mixtures include BL003, BL004, BL009, BL011, BL012, BL032, BL036, BL037, BL045, BL046, ML-1001, ML-1002, as well as TL202, TL203, TL204 and TL205, all obtainable from E. Merck, supra.

TOTN404, available from Hoffman-LaRoche, Basel, Switzerland and Nutley, N.J., is a liquid crystal mixture similar to E7 but with added pyrimidines. It contains approximately 30 weight percent of 4-carbonitrile,4'-pentyloxy-1,1-biphenyl commonly known as 5OCB, 15 weight percent of 4-carbonitrile,4'-octyloxy-1,1-Biphenyl, commonly known as 8OCB, 10 weight percent of 4-carbonitrile-4"-pentyl-1,1',4', 1"'-terphenyl, commonly known as SCT, 10 weight percent of 4-(5-pentyl-2-pyrimidimyl)-benzonitrile, commonly known as RO-CP-7035, 20 weight percent of 4-(5-heptyl-2-pyrimidimyl)-benzonitrile, commonly known as RO-CP-7037, and 15 weight percent of 4-[5-(4-butylphenyl)-2-pyrimidinyl]benzonitrile, commonly known as RO-CM-7334.

ROTN-570, available from Hoffman-LaRoche is a cyanobiphenyl liquid crystal mixture comprises 51 weight percent of 4-cyano-4'-pentyiuiphenyl, 25 weight percent of 4-cyano-4'-heptylbiphenyl, 16 weight percent of 4-cyano-4'-octyloxybiphenyl, and 8 weight percent of 4-cyano-4'-pentyl-p-terphenyl. Another desirable liquid crystal mixture from Hoffman-LaRoche is TNO623.

The invention encompasses non-homogeneous mixtures of the metallo organic mesogen and the conventional liquid crystals (the non-organometallic liquid crystals). This is accomplished by keeping the different liquid crystals in separate phases. Such phase distinction can be effected by encapsulating either or both of the types of liquid crystals (organometallic liquid crystals vs. non-organometallic liquid crystals) in a polymeric medium. A convenient way of doing this is to encapsulate the liquid crystals, one type or the other, or both types, by NCAP techniques, such as those described above. The NCAP'd liquid crystals can be mixed with the non-encapsulated liquid crystals and the combination, or the NCAP'd mixture alone, can be conventionally polymer dispersed.

Focusing now on the dyes, a good dye must meet certain criteria: high extinction in the region of the desired wavelength, the solubility in liquid crystalline host (but not as much in the polymer matrix), photo, chemical and thermal stability. Commercial liquid crystals have a central structure unit, called core, consisting mostly of azoxy groups, Schiff bases, ester groups or just biphenyl groups. Often, these LCs, consist of a mixture of these substances (particularly mixtures of cyanobiphenyls). One example of these liquid crystals are the TN 0623 (provided by Roche) and BL036 (supplied by Merck), both mixtures cyanobiphenyls. Both have good solubility in the polymer matrix used, named with the abbreviation NOA65, which consists of a mixture of trimethylolpropane, diallylether, isophorone diisocyanate ester, trimethylolpropane tristhiol and benzophenone as photoinitiator.

From previous work it was found that dyes based on metal complexes can be successfully employed in the PDLC. In particular, it has emerged that these result in a reduction of the use voltage, the haze, the aging and an increase in the contrast ratio and the high-angle transmittance. In addition, it was found that the addition of such dyes has no major effect on the isotropic temperature of the liquid crystal.

Another advantage in the use of metal complexes is due to the wide range of structural variations that can be made using the same metal center and the type of coordination. In fact one can get metal complexes that are colored and also are much more soluble in the liquid crystal by means of a minimal structural variation. For example, the use of two different chelating, coordinated to palladium through the same square planar structure, has allowed great variation in the absorption spectrum of the complex; and the inclusion of more flexible chains in the cyclopalladate binder allowed to somewhat improve the solubility.

Finally, the thermal and photochemical stability of these complexes is high, even higher than that of typical organic chromophores having absorption at the same wavelength. The molar absorption coefficient is often comparable to that of traditional organic dyes.

Synthesis of Mom Dyes of the Present Invention

Two examples for the synthesis of MOM comprising chromophore will be now described:

Synthesis of mononuclear metal organic chromophores M1 and M2, and their respective intermediaries' dimeric complexes D1 and D2 will be described. These are the formulas of M1, M2, D1 and D2:

The process of the first example (M1) begins with the synthesis of the aldehyde 4-octilossibenzaldeide. This synthesis takes place by means of the condensation reaction between the 1-bromooctane and p-hydroxybenzaldehyde, according to the following scheme:

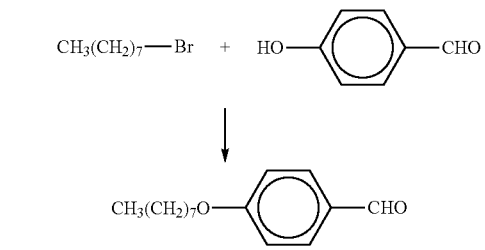

In a flask are weighed 20 g of p-hydroxybenzaldehyde (MW=122.13), 38 g of 1-bromooctane (MW=193.13) and 45 g of potassium carbonate (MW=138.21) and added to 250 ml of N, N-dimethylformamide. The reaction takes place under reflux for 4 hours. The suspended solid is removed by filtration, washed with dimethylformamide, and the liquids are combined and concentrated. By addition of iced-water the aldehyde of yellow-amber color is recovered, which is used as crude product, and characterized by $^1$H-NMR spectrum, whose data are in agreement with the expected structure.

Next step is the synthesis of the imine I1 (N-[(4-octan-oxyphenyl)methylene]-4-butylbenzenamine). This synthesis occurs by condensation between 4-octyloxybenzaldehyde and butylaniline according to the following scheme:

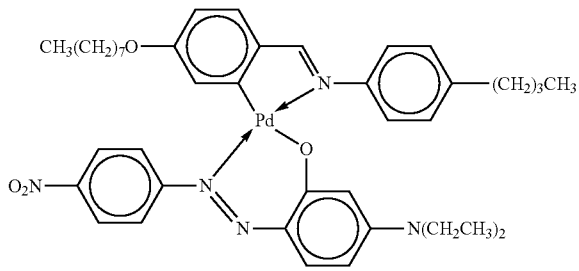

M1

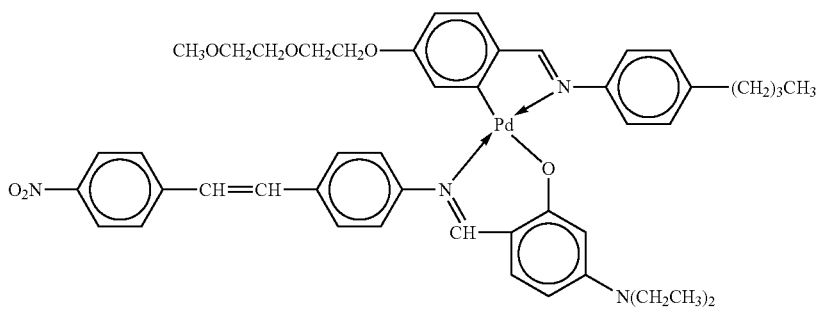

M2

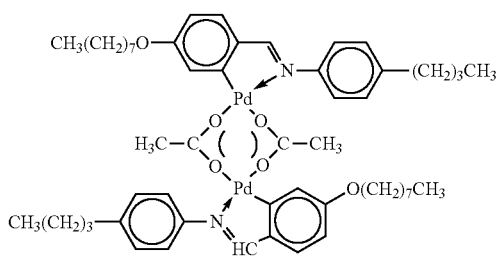

D1

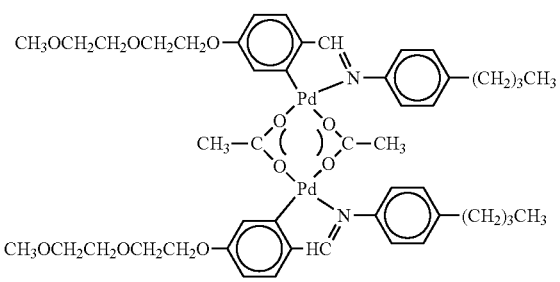

D2

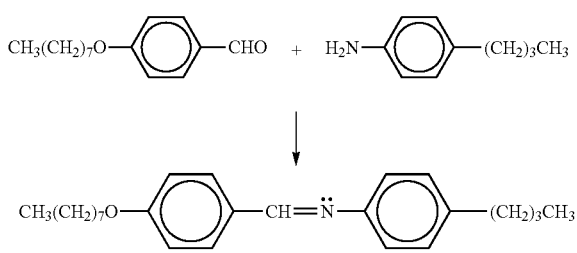

In a flask are weighed 2.50 g of aldehyde (MW=234.37) and 1.49 g of 4-butylaniline (MW=149.27) and added about 30 ml of methanol and three drops of acetic acid. The solution is heated to boiling point. After about 10 min., for subsequent cooling in water and ice, it is obtained from it a whitish precipitate which is recovered by filtration and recrystallized from boiling methanol.

Melting point: 80° C. The data obtained from the $^1$H-NMR spectrum are in agreement with the expected structure.

The next step is the synthesis of the dinuclear D1 (Bis [μacetate-kO:kO')]bis5-octanoxy-2-(4-butylphenyl)imino] methylphenyl-C,N]palladium). The dimeric species is obtained for cyclopalladation, by reacting the palladium acetate (II) with equimolar amounts of the imine I1 in acetic acid. In about 10 ml of acetic acid are suspended 804 mg of imine (MW=365.61) and 204 mg of palladium acetate (II) (MW=224.49). While heating, a red-orange color solution is obtained from which, at room temperature, a yellow crystalline precipitate is obtained. Melting point: 212° C. Tdec=238.22° C.

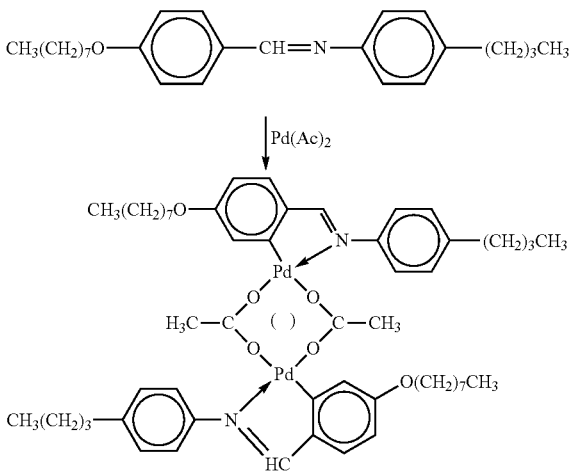

Next step is the synthesis of the chelating C1 (2-(4-nitrophenyl) azo]-5-diethylamino]phenol). The synthesis is made, as for similar compounds starting from equimolar amounts of 2-diethylamino-phenol (MW=165.24) and 4-nitroaniline (MW=138.13), first forming, in HCl acid solution, the salt of diazonium of 4-nitroaniline, and then adding this to the phenol, in ethyl alcohol.

A precipitate is formed which is isolated and crystallized from chloroform/heptane, obtaining purple crystals.

Next step is the synthesis of mononuclear complex M1 ([5-(diethylamino)-2-[(4-nitrophenyl)azo-kN[phenate-kO] [2-[[(4-butylphenyl)imino-kM-5-octanoxyphenyl-kC]palladium). The synthesis of the mononuclear complex involves the reaction between the chelating C1 and dimer D1 according to the synthesis scheme shown below.

In about 40 ml of dichloromethane and 15 mml of ethanol the following should be added: 296 mg of the chromophore (MW=314.38), 500 mg of K2CO3, 300 mg of sodium acetate and finally 500 mg of dimer (MW=1060.12). The suspension is kept under stirring at room temperature for about 30 minutes. Subsequently, the organic salts are filtered away, concentrate the liquid and, in response of further addition of ethanol, a precipitate is obtained which is crystallized twice from chloroform/hexane, to obtain crystals of brown color.

The complex is obtained as a purple-brown microcrystals, present in the form of two crystalline modifications.

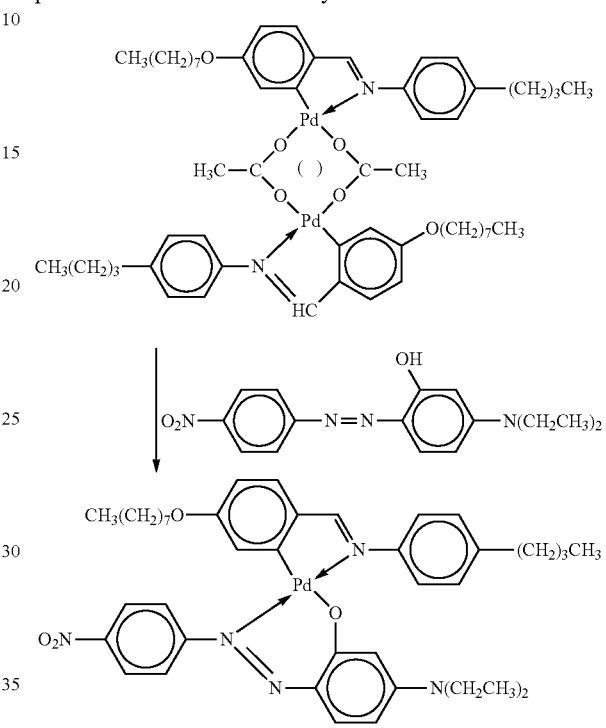

The process of the second example (M2) begins with the synthesis of the aldehyde (4-[2-(2-methoxyethoxy)ethoxy [benzaldehyde). This synthesis takes place by means of the reaction between the chloride of diethylene glycol monomethyl ether (glyme) and the p-hydroxybenzaldehyde, according to the synthesis scheme:

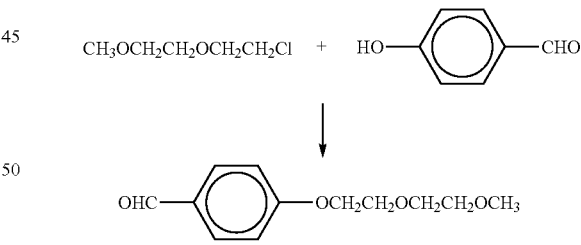

In a flask are weighed 19.79 g of p-hydroxybenzaldehyde (MW=122.13), 24.879 g of chloride in glyme (MW=138.61), 50 g of potassium carbonate (MW=138.21) and 200 ml of dimethylformamide. The reaction is conducted at reflux for 2 days. The aldehyde is recovered as a yellowish liquid from the liquids, after the salts have been filtered off, and the solvent removed under vacuum. The structure of the compound is confirmed by $^1$H-NMR spectrum. The product is used crude in the next reaction.

The next step is the synthesis of the amine 12 (4-N-[4-[2-(2-methoxyethoxy)etoxyphenyl[methylene[butylbenzenamine). The synthesis occurs by condensation between the aldehyde and the 4-butylaniline according to the synthesis scheme:

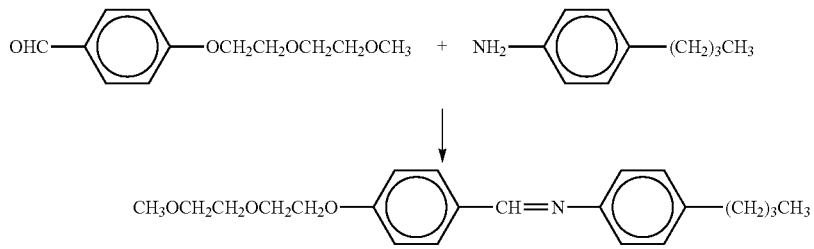

In a flask are weighed 30 g aldehyde (MW=224) and 20 g of 4-butylaniline (MW=149.27), and there are added about 50 ml of ethanol, and finally 4 drops of acetic acid. The solution is heated to boil for 2 hours. After this time, the solvent is eliminated in vacuum. The oily product is then washed twice with hot hexane. The imine obtained is liquid at room temperature but crystallizes in the freezer. This is characterized by $^1$H-NMR spectrum, obtaining data in accordance with the expected structure.

Next step is the synthesis of the dinuclear complex D2 (Bis[μ-(acetate-kO:kO')]bis[5-[2-(2-methoxyethoxy) ethoxy]-2-[[(4-butylphenyl)imine]methyl]phenyl-C,N]di-palladium). Also this dimeric species is obtained by cyclo-palladation, by reacting the palladium acetate (II) with equimolar amounts of the imine 12 in acetic acid. In about 15 ml of glacial acetic acid are suspended 2.2 g of imine (MW=371.52) and 59 mg of palladium acetate (II) (MW=224.49). When heating (200° C.) a red-brown solution is obtained. After 5 days of stirring at ambient temperature, the solvent is removed under vacuum, thus obtaining the dimer that presents itself as a solid earthy yellow ocher. The following figure shows the synthesis scheme.

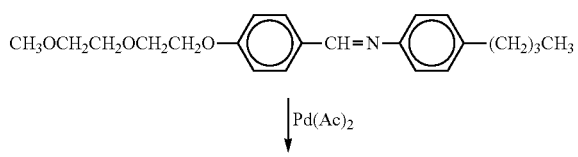

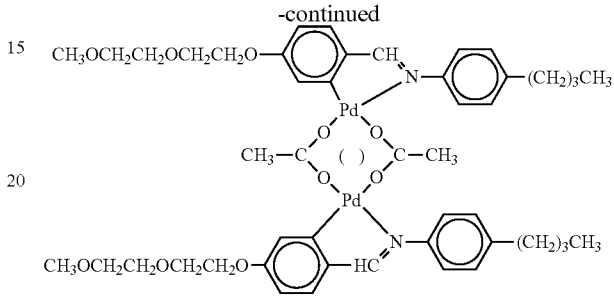

The next step is the synthesis of the chelating C2 (2-[[[[4-[2-(4-nitrophenyl)ethenyl]phenyl]imino]methyl]-5-diethyl-imine]phenol. The chelating C2 was obtained as already developed for obtaining different palladium complexes.

The next step is the synthesis of the mononuclear complex M2 ([5-(diethylamine)-2-[[[[(4-nitrophenyl)ethenyl]phenyl] imine-kN]methyl]fenate-kO][2-[[(4-butylphenyl)imine-kN] methyl)-5-[2-(2-methoxyethoxy)ethoxy]phenyl-kC]palladium). The synthesis of the mononuclear complex involves the reaction between the chelating chromophore and the dimer according to the following synthesis scheme. In about 20 ml of dichloromethane/ethyl alcohol are added 542 mg of the chromophore C2 (MW=415.47), 600 mg of K2CO3 (subsequently other 400 mg), 450 mg of sodium acetate and finally 678 mg of dimer D2 (MW=1039.86). This is kept under stirring at 50° C. for about 1.5 hours and then at room temperature for another 30 minutes. Subsequently, the organic salts are filtered away, concentrate the liquids and, by the addition of ethanol, a precipitate is obtained which is crystallized twice from dichloromethane/ethanol, to obtain crystals of yellow-orange color, which show under a polarizing microscope two crystalline modifications.

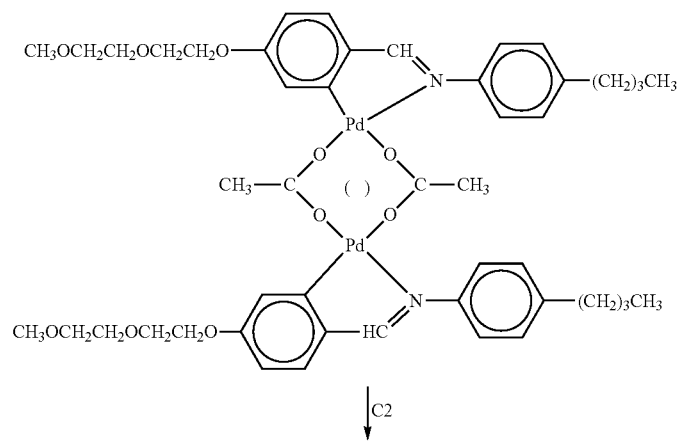

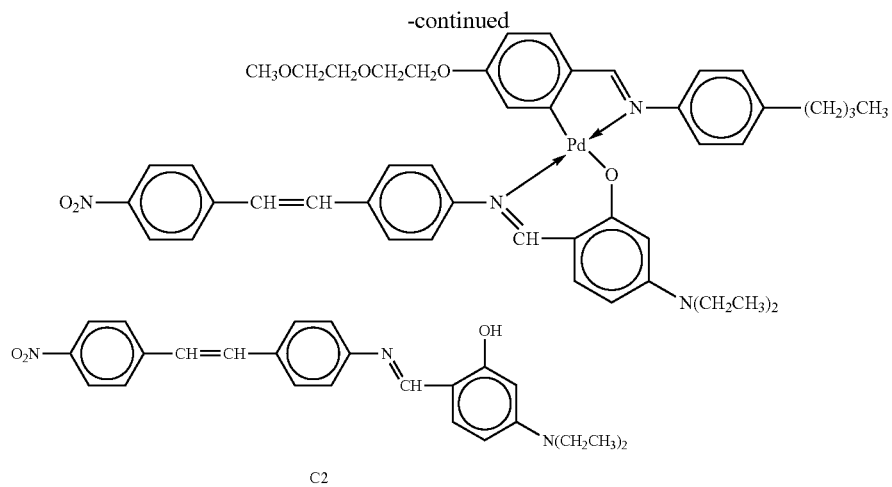

C2

It is an intention of this invention to provide combinations of organic chromophores with MOM-chromophores.

Eutectic Mixtures Methods

The invention also provides a method for creating thermodynamically stable "eutectic mixtures". The metallomesogen mixtures were prepared by two mixing approaches:

Physical method: which is the conventional mixing of the components;

Chemical method: a novel one-pot synthesis of multi-component material.

Physical mixtures: These materials consisted of binary, ternary and multi-component mixtures incorporating both metallomesogens and their parent ligands. The phase diagram studies indicated a good miscibility of the components and frequently provided mixtures with eutectic behavior, having a wider mesophase and lower transition temperature than those of their components. In some cases, we even obtained mixtures with mesophase stability within (−30° C.-(+45° C. temperature range, useful for application. Physical mixing can be done using two or more compounds. When using two it is call binary mixtures and when using 3 it is called ternary mixtures. Some examples of physical mixing are:

Binary mixtures:
M–Lm+Lm
M–Lm+M–Ln
Lm–M–Lm+Ln–M–Ln
Lm–M1–Lm+Lm–M2–Lm
M–Lm+NLC
M–Lm+CLC In the next parts, will be presented several examples of preferred embodiments. The examples are being divided by topics as follows: a) synthesis; b) thermal & spectra, optical properties; c) MOM mixtures; d) guest-host mixtures; and e) MOM-PDLC.

A. Examples of Synthesis

Example 1

Synthesis of HL2 Ligand: C22H28N2O

The synthesis of HL2 ligand C22H28N2O is achieved by the diazotation of the 4-hexylaniline. The subsequent coupling with phenol affording the 4-hydroxy-4'-hexylazobenzene (I) and the etherification with 4-bromo-1-butene, as shown in the following scheme:

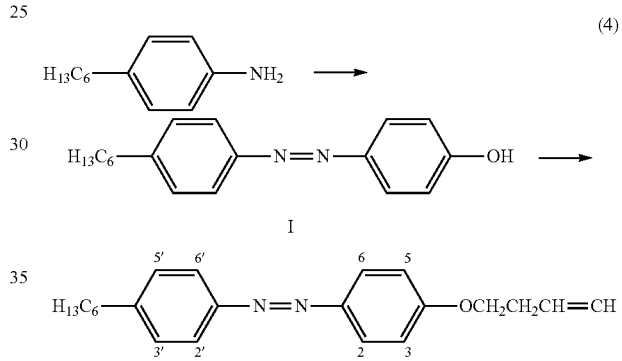

(4)

8.5 mmol (1.5 g) of 4-hexylaniline were dissolved, under nitrogen, in 8 mL of water and 2.1 mL of HCL (36%). The solution was cooled at 0° C. and 8 mL of an aqueous solution of NaNO2 (0.6 g, 9.1 mmol), were added, keeping the temperature of the solution lower than 5° C. Phenol (0.8 g, 8.5 mmol) dissolved in 2.5 mL of NaOH 2N was added dropwise to the solution of the diazonium salt. The reaction mixture was allowed to warm to room temperature and extracted with methylene chloride; the organic layer was dried over anhydrous sodium sulfate and evaporated under reduced pressure. The crude product I was purified by chromatography (silica gel, hexane/diethyl ether, 1/1) and recrystallized from n-heptane to give the pure product as a brown solid, in 70% yield (1.67 g).

In a second step, the azocompound I (0.5 g, 2.2 mmol), 4-bromo-1-butene (3.5 mmol, 0.4 mL) and anhydrous potassium carbonate (0.9 g, 8.8 mmol) were suspended in 7 mL of cyclohexanone and refluxed under nitrogen for 24 h. The mixture was allowed to cool and filtered to remove the solid (salts); the evaporation of the solvent left an orange solid which was purified by recrystallization from methanol, obtaining 0.42 g of the final ligand.

Chemical formula: C22H28N2O
Synthetic yield: 70%.
Color: Pale yellow.
Mesophase: Enantiotropic nematic
Transition Temperatures: CN=41.7° C.; NI=51.1° C.; IN=48.1° C.; NC=14.8° C.

IR: 3049 cm−1 (═CH2 stretching), 984, 921 cm−1 (═CH2 bending out of plane).

1H NMR: □: 7.89 (d, 2H, H2',6'); 7.80 (d, 2H, H2,6); 7.30 (d, 2H, H3,5); 7.00 (d, 2H, H3',5'); 5.78 (m, 1H, CH═CH2); 5.04 (m, 2H, CH═CH2); 3.97 (t, 2H, OCH2).

Anal. Calc.: (336.47): C, 78.53; H, 8.39; N, 8.33. Found: C, 78.63; H, 8.42; N, 8.45.

Example 2

Synthesis of Metallomesogen Complex L2Pd-acac (C27H34N2O3-Pd)

The synthesis of metallomesogen (MOM) C27H34N2O3-Pd complex was accomplished by the following two-step reactions:

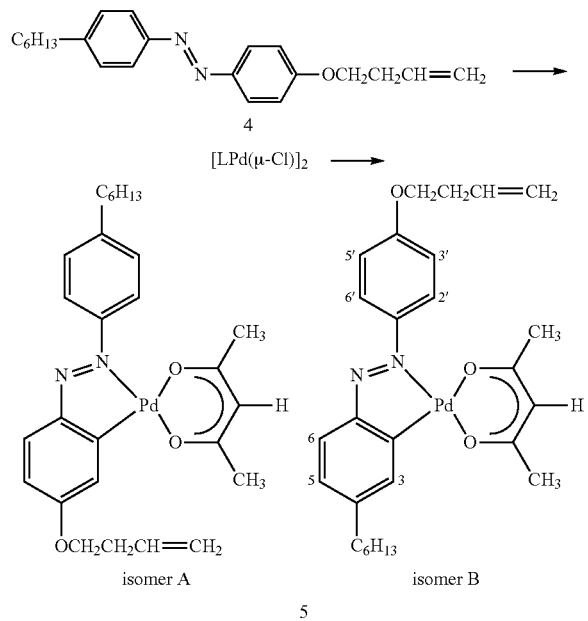

Firstly, the cyclo-palladation of the ligand 4-(3-butenoxy)-4'-hexylazobenzene 4, with [(PhCN)2PdCl2], afforded the din-uclear chloro-bridged derivative [LPd(□□Cl)]2, then, by a bridge-splitting reaction with potassium acetyl-acetonate complex 5 has been obtained as an isomeric mixture of the A and B complexes, in a molar ratio 2:1, resulting from the nonselective palladation of the two phenyl rings. To a suspension of 0.1 g of 4 in methanol (5 mL) was added an equimolar amount of [Pd(PhCN)Cl]2 (0.11 g) dissolved in 6 mL of benzene. The mixture was stirred at room temperature for 24 h and the brown solid formed was filtered off and recrystallized from methylene chloride/ethanol to give the pure product [LPd(□□Cl)]2 as an ochre yellow solid, in 83% yield (0.12 g). In a second step, to a suspension of [LPd(□□Cl)]2 (0.05 g, 0.05 mmol) in ethanol (8 mL) 3 equivalents of potassium acetylacetonate (0.02 g) were added and the mixture was stirred, under nitrogen, for 5 h; a white insoluble residue (salts) was filtered off and the filtrate was evaporated under reduced pressure to give 5 as a red solid which was recrystallized from chloroform/ethanol.

Chemical formula: C27H34N2O3-Pd
Synthetic yield: 80%.
Color: Yellow.
Mesophase: Monotropic nematic
Transition Temperatures: CI=66.2° C.; IN=43.1° C.; NC<−35° C.
IR: 3074 cm−1 (═CH2 stretching); 984, 914 cm−1 (═CH2 bending out of plane).

1H NMR: Isomer A: 7.90 (d, 2H, H2',6'); 7.80 (d, 1H, H6); 7.23 (d, 2H, H3',5'); 7.03 (d, 1H, H3); 6.73 (dd, 1H, H5); 5.99 (m, 1H, CH═CH2); 5.42 (s, 1H, Hacac); 5.17 (m, 2H, CH═CH2); 4.17 (t, 2H, OCH2); isomer B: 8.04 (d, 2H, H2,6); 7.77 (d, 1H, H6'); 7.33 (s, 1H, H3); 7.05 (d, 1H, H5'); 6.95 (d, 2H, H3,5); 4.10 (t, 2H, OCH2)

Anal. Calc.: (556.97): C, 58.22; H, 6.15; N, 5.03. Found: C, 58.22; H, 6.15; N, 5.11.

Chemical Mixing

Chemical mixtures: These metallomesogen materials exhibited either nematic, cholesteric or smectic mesophases. The mixtures showed large mesomorphic range and lower transition temperatures than those of the single-components metallomesogens. In most cases, these materials did not crystallized upon super-cooling or quenching and maintained their mesomorphism even below 0° C.

Example 3

Synthesis of One-Pot Chemical Mixture of Salicylal-Diaminate Metallomesogen Complexes "One-Pot" Solution Synthesis: The syntheses of "one-pot" multi-component metallomesogen mixtures based on Salicylal-diaminates Metal Complexes were carried out by simultaneous reaction of the appropriate precursors, as in the synthesis of one-component metallomesogens. Each "in-situ" mixture consisted of a three-component system corresponding to the following general chemical structure:

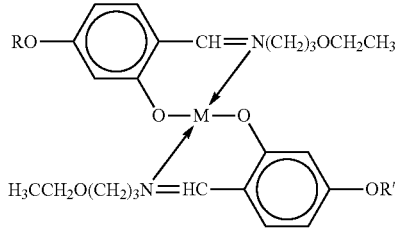

Two iso-functional were linked (both aldehydes) molecules to react simultaneously with the amine and, eventually, with the metal ion. Although only two iso-functional species were utilized (aldehydes and/or amines), a simultaneous synthesis of more than two iso-functional species could provide an increasing number of structurally different metal complexes. Six three-component "in-situ" metallomesogen mixtures were prepared at various combinations of metals and ligands. Each component of the mixture designated with the short formula: L-MII-L, consisted of either MII=Ni2+ and VO2+ complexed to different combinations of ligands with aliphatic (L), chiral (L*) or acrylic (L') chains shown in the following structures:

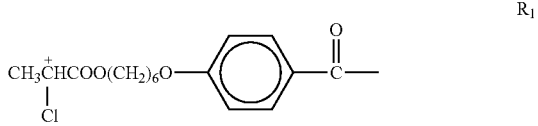

-continued

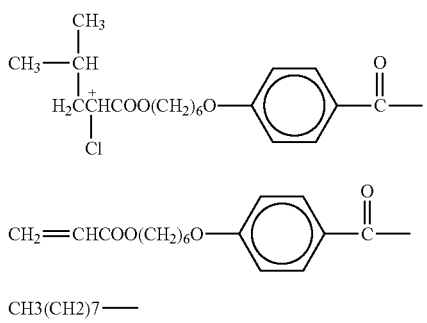

Other examples of the compounds formulas achieved by chemical mixing are:

Example 4

| MOM | Component-1 | | Component-2 | | Component-3 | | Metal | Color |
|---|---|---|---|---|---|---|---|---|
| | R | R' | R | R' | R | R' | | |
| Gauzy-1 | R4 | R3 | R4 | R4 | R3 | R3 | $Ni^{2+}$ | Pale Green |
| Gauzy-2 | R4 | R3 | R4 | R4 | R3 | R3 | $VO^{2+}$ | Pink |

Formula of the Metallomesogen Chemical Mixtures:
Gauzy-1 & Gauzy-2:
25% R&R': —(CH2)7-CH3;
25% R&R': -C6H5-O—(CH2)6-OOC—CH=CH2;
50% R: —(CH2)7-CH3; R': -C6H5-O—(CH2)6-OOC—CH=CH2.

Example 5

Synthesis of L1HgCl-acac Metallomesogen Complex

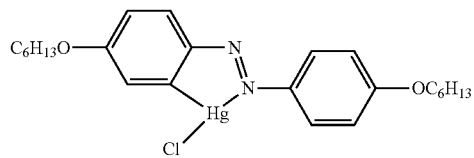

Synthesis of L1HgCl-acac MOM complex with formula C24H33N2O2HgCl was carried out as follows: A 0.44 M ethanolic solution of 4,4'-hexyloxyazobenzene, (0.30 g, 78.4 mmol) was added of an equimolar amount of mercuric acetate (0.25 g). The mixture was refluxed for 24 h, then allowed to cool down to room temperature, added of 0.03 g (78.4 mmol) of lithium chloride and stirred for about 15 min. Methylene chloride (10 mL) was added to the mixture and the undissolved precipitate was removed by filtration. The filtrate was evaporated to dryness and the residue was purified by chromatography (silica gel, hexane/ethyl ether, 7/1) to give 0.19 g.
Chemical formula: C24H33N2O2HgCl
Synthetic yield: 40% yield.
Color: Yellow.
Mesomorphism: None
Transition Temperature: CI=100.2° C.
1H NMR (300 MHz, CDCl3)=7.98 (dd, 3H, Har), 6.98 (m, 4H, Har), 4.02 (t, 2H, OCH2.).
Anal. Calc.=(617.58): C, 46.68; H, 5.39; N, 4.53. Found: C, 46.26; H, 5.27; N, 4.70.

Example 6

Synthesis of L3Pd-acac Metallomesogen Complex

The synthesis of metallomesogen (MOM) C29H41N2O2-Pd complex was accomplished by a two-steps reaction; the cyclo-palladation of the ligand 4-4'hexylazobenzene with [Pd(PhCN)2C12], to give the intermediate dinuclear chloro-bridged derivative [LPd(☐☐Cl)]2, followed by a bridge-splitting reaction with potassium acetylacetonate, affording complex 6.

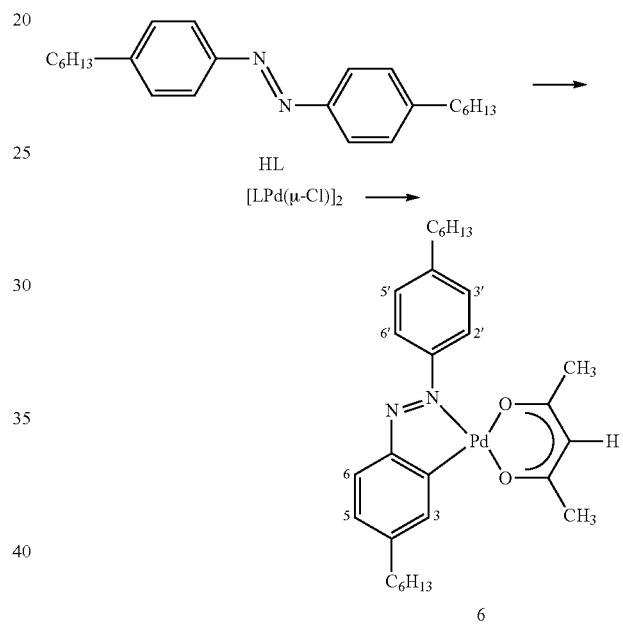

A benzene (10 mL) solution of [Pd(PhCN)2C12] (0.22 g, 0.57 mmol) was added to a suspension of 4-4'hexylazobenzene, HL, in methanol (10 mL) and stirred for 2 days. The precipitated was filtered off and purified by recrystallization from chloroform/ethanol to give 0.22 g of [LPd(☐☐Cl)]2 as a brown solid (80% yield). To a stirred suspension of the chloro-bridged complex [LPd(☐☐Cl)]2 (0.10 g, 0.10 mmol) in ethanol (20 mL) were added three equivalents of potassium acetylacetonate (0.04 g). The mixture was stirred at room temperature for 6 h; the orange solid so formed was filtered off, washed with water and ethanol and recrystallized from diethyl ether affording 0.06 g of the pure complex.
Chemical formula: C29H41N2O2
Synthetic yield: 53%.
Color: Yellow.
Mesophase: Monotropic nematic
Transition Temperatures: CI=69.1° C.; IN=39.1° C.; NC=23.8° C.
1H NMR: ☐: 7.94 (d, 2H, H2',6'); 7.81 (d, 1H, H6); 7.5 (d, 1H, H3); 7.26 (d, 2H, H3',5'); 7.05 (dd, 1H, H5); 5.42 (s, 1H, H7); 2.68 (t, 2H, CH2).
Anal. Calc.: C, 62.64; H, 7.43; N, 5.04. Found: C, 62.60; H, 7.30; N, 5.07.

Example 7

Synthesis of Red Metallomesogen Dye MOD Pd-AZO1

We synthesized a new series of chomophore contained metallomesogen dyes on the basis of general formula Pd—(C,N-imine-N,O-azo). The chemical formula, structure, synthesis, thermal & absorption band of the red dye component MOD Pd-AZO1 are as follows:

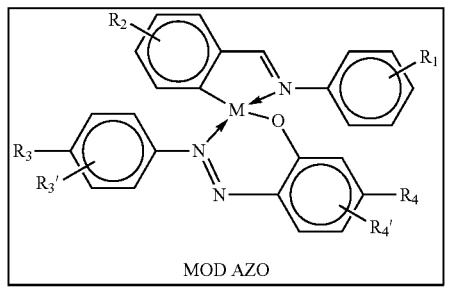

MOD AZO

M=Pd, $R_1$=p-$(CH_2)_3CH_3$, $R_1'$=H, $R_2$=O$(CH_2)_7CH_3$, $R_2'$=H, $R_3$=p-$NO_2$, $R_3'$=H, $R_4$=N$(CH_2CH_3)_2$, $R_4'$=H.

296 mg of C1 are dissolved in 40 mL of dichloromethane and 15 mL of absolute ethanol, then 500 mg of potassium carbonate and 300 mg of sodium acetate are added, at the end 500 mg of D1 are added too. The suspension is kept under stirring for about 30' at room temperature. After this time it is filtered and concentrated to about a third of the volume, about 30 mL of ethanol are added, thus obtaining a precipitate dark yellow. This was crystallized twice from chloroform/hexane (2:1.5), giving a crystalline solid purple, red in solution, present in two different crystalline modifications. PF: 163.5° C.; 169.5° C. $T_{dec}$ (weight loss of 5%): 260° C. UV-Vis spectrum in chloroform: wavelength of maximum absorption: 521 nm, molar extinction coefficient: □30000 cm$^{-1}$mol$^{-1}$ L.

Example 8

Synthesis of Yellow Metallomesogen Dye MOD Pd-IMM1

We synthesized a new series of chomophore contained metallomesogen dyes on the basis of general formula Pd—(C,N-imine-N,O-azo). The chemical formula, structure, synthesis, thermal & absorption band of the yellow dye component MOD Pd-IMM1 are as follows:

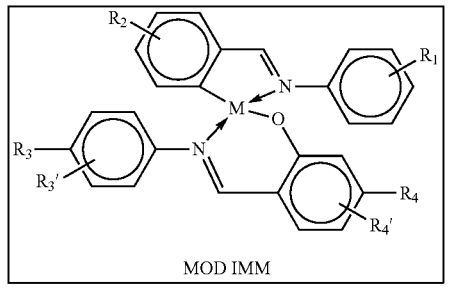

MOD IMM

M=Pd, $R_1$=p-$OCH_3$, $R_1'$=H, $R_2$=OCO-p-$(C_6H_4)$-p-$OCH_3$, $R_2'$=H, $R_3$=p-$NO_2$, $R_3'$=H, $R_4$=N$(CH_3)_2$, $R_4'$=H.

542 mg of C2 are dissolved in 15 mL of dichloromethane and 5 mL of absolute ethanol, then 600 mg of potassium carbonate and 450 mg of sodium acetate are added, at the end 678 mg of D2 are added too. The suspension is kept under stirring for about 60' at 50° C. After this time it is filtered and concentrated to about a third of the volume, about 30 mL of ethanol are added, thus obtaining a precipitate dark yellow. This was crystallized twice from dichloromethane/ethanol (2:1.5), giving a crystalline solid orange, yellow in solution, present in two different crystalline modifications. PF: 180.5° C.; 193.5° C. $T_{dec}$ (weight loss of 5%): 300° C. UV-Vis spectrum in chloroform: wavelength at maximum absorption: 420 nm and 353 nm, having one pick with double maximum, molar extinction coefficient: 37000; 36000 cm$^{-1}$mol$^{-1}$ L.

Example 9

Synthesis of Blue Metallomesogen Dye MOD Pd-TIO1

We synthesized a new series of chomophore contained metallomesogen dyes on the basis of general formula Pd—(C,N-imine-N,O-azo). The chemical formula, structure, synthesis, thermal & absorption band of the yellow dye component MOD Pd-IMM1 are as follows:

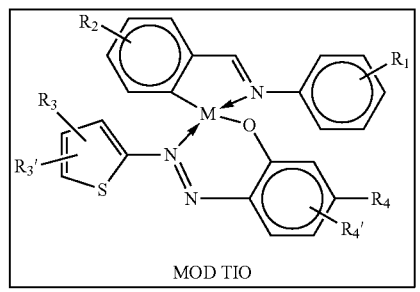

MOD TIO

M=Pd, $R_1$=p-$(CH_2)_3CH_3$, $R_1'$=H, $R_2$=OCO$(C_6H_4)$p-$OCH_3$, $R_2'$=H, $R_3$=3-$NO_2$, $R_3'$=5-$NO_2$, $R_4$=N$(CH_2CH_3)_2$, $R_4'$=H 387 mg of C3 are dissolved in 40 mL of dichloromethane and 15 mL of absolute ethanol, then 500 mg of potassium carbonate and 300 mg of sodium acetate are added, at the end 553 mg of D3 are added too. The suspension is kept under stirring for about 30' at room temperature. After this time it is filtered and concentrated to about a third of the volume, about 30 mL of ethanol are added, thus obtaining a brown precipitate. This was crystallized twice from chloroform/hexane (2:1.5), giving a crystalline solid green, blue in solution.

PF: 231° C. $T_{dec}$ (weight loss of 5%): 240° C. UV-Vis spectrum in chloroform: wavelength of maximum absorption: 621 nm, molar extinction coefficient: ≈30000 cm$^{-1}$mol$^{-1}$ L.

B. Examples of Thermal, Spectra and Optical Properties

Example 10

Effect of Metallomesogen Solubility in Guest-Host System

CuLC1/TN0623

| Cu—LC1 (% wt) | Tni (° C.) | Days |
|---|---|---|
| 0 | 105 | — |
| 4.8 | 103.2 | 1 |
| 9.3 | 102.9 | 3 |
| 16.8 | 101.3 | 9 |
| 23.2 | 100.4 | 14 |

Example 11

Effect of Metallomesogen Mixture Solubility in Nematic Host

Gauzy-8 ($L_1$-Ni-$L_1$*/$L_2$-Ni-$L_2$')+TNO623 (1:9 w/w)

| Mixture | Transition Temperatures (° C.) | | | | Mesophase |
|---|---|---|---|---|---|
| | C—M | M—I | I—M | M—C | |
| Gauzy-8 | 97 98.5 | — | 94-92 | Super Cool | monotropic cholesteric |
| TNO623 | — | 104 | 102 | (−35) | Nematic |
| Gauzy-8/ TNO623 | — | 100- 101 | 101- 96 | Super Cool | enantiotropic cholesteric |
| Gauzy-8/ TNO623 Ac6O6ONi (2%) | — | 100.5- 103.5 | 99- 96 | Super Cool | enantiotropic cholesteric |
| Gauzy-8/ TNO623 Ac6O6Oni Benzophenone (3%) UV Cured | — | 95- 97.5 | 97- 90 | Super Cool | enantiotropic cholesteric |

DSC heating & cooling rates = 3°/min.
UV Exposure: I = 2 mW/cm2, t = 2 hours, l = 5 cm, d = 10 microns

Example 12

Absorption Spectra of Black Metallomesogen Dye

We have made a black dye mixture by mixing the three synthesized red, yellow and blue MOM components of examples 7, 8 and 9, respectively. Equal weight of three dyes were mixed and dissolved in $CHCl_3$ solvent. The absorption spectra of the black MOM dye were measured by JASCO V-560 UV-VIS spectrophotometer. The measurements of the spectra were carried out on a 0.1 micron thick black dye sample sandwiched between two quartz glass. The spectra of black dye are presented in FIG. 1. Curve 100 represents the absorption spectrum of an as-made sample, while curve 110 represents the absorption spectrum of a sample that had been aged under sunlight for 2 months.

Example 13

Absorption Spectra of Ligands, Metallomesogens, and their Mixtures

| Compound | Absorption Wavelength λ (nm) | | | | |
|---|---|---|---|---|---|
| Ligand | | | | | |
| L1 | 420 | 380 | 258 | 229 | 222 |
| MOM | | | | | |
| Pd-L1 | 428 | | 318 | 230 | 220 |
| MOM-Ligand Mixture | | | | | |
| L1 + Pd-L1 (50:50) | 430 | 360 | | 230 | 222 |
| L1 + L3 + Pd-L1 + Pd-L5 (25:25:25:25) | (430) | 361 | 270 | 232 | (218) |

(Perkin-Elmer Ultra-2 UV-VIS Spectrometer; Solvent: $CHCl_3$; $C_{MOM}$ = 0.1 wt %)

Example 14

Absorption Spectra of Metallomesogens with Various Metals and Ligands

| Compound | Absorption Wavelength-λ (nm) | | | | |
|---|---|---|---|---|---|
| Various Metals | | | | | |
| A6O—6ON—VO | | 320 | 277 | 229 | |
| | | | 267 | | |
| A6O—6ON—Ni | | 354 | 275 | 230 | |
| | | | 268 | | |
| A6O—6ON—VO + 6O6ON—Ni | | 345 | 277 | 230 | 211 |
| | | | 267 | | 206 |
| 8-9NCO—Cu | | 359 | 277 | 221 | 201 |
| | | | 268 | | 211 |
| 8-9NCO—Pd | 389 | | 277 | 221 | 201 |
| | | | 267 | | |
| 8-9NCO—Cu + 8-9NCO—Pd | 363 | | 277 | 240 | 211 |
| | | | 267 | | |
| Various Ligands | | | | | |
| 12-8Ncu | | 359 | 278 | 229 | 211 |
| | | | 268 | | |
| A6-8NCu | | 359 | 277 | 229 | 220 202 |
| | | | 267 | | 213 ? |
| 8-8NCOCu | | 358 | 275 | 241 | 212 205 ? |

(Perkin-Elmer Ultra-2 UV-VIS Spectrometer; Solvent: $CHCl_3$; $C_{MOM}$ = 0.1 wt %)

Example 15

Some Optical Parameters of Metallomesogens

| MOM* | λ (nm) | Order Parameter | Dichroic Ratio |
|---|---|---|---|
| A6O6ON—Ni | 420 | 0.592 | 5.83 |
| L2—Pd-acac | 465 | 0.533 | 3.33 |
| | 375 | 0.459 | 4.44 |

*Measurements were carried out at 3.5% MOM concentration in AN5

Examples of MOM Mixtures

Example 16

Binary Metallomesogen Mixtures with Different Ligands: 12-8N-Cu/A6-O8N—Cu

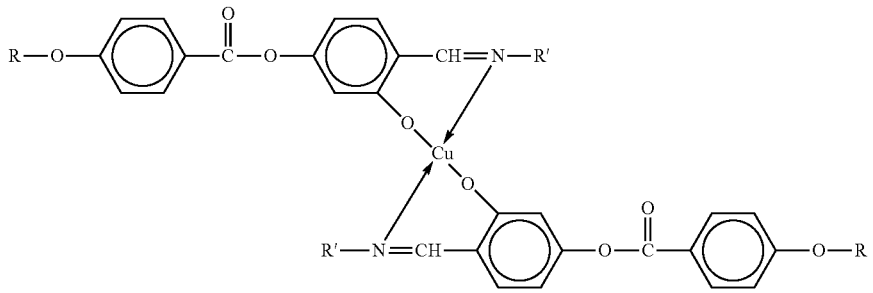

Figure 2:
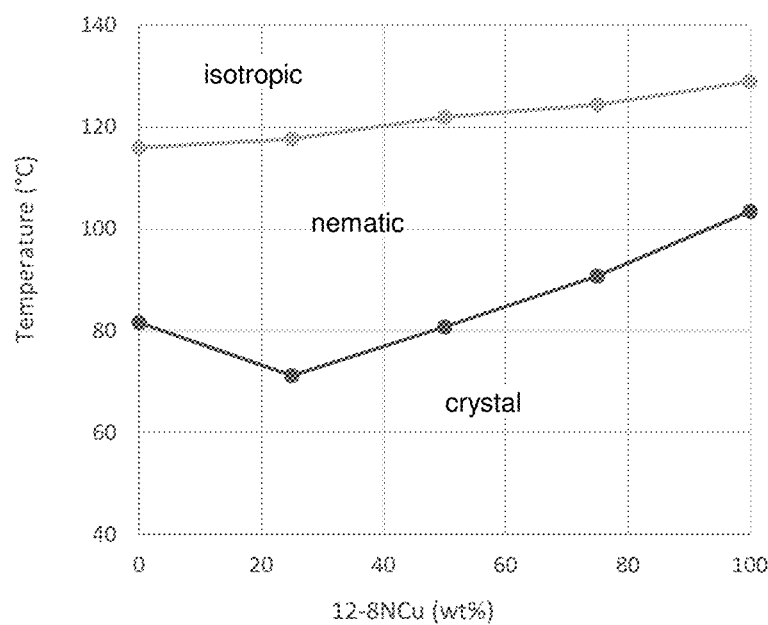
FIG. 2 presents a portion of a phase diagram for binary mixtures of 12-8NCu and A6-O8N—Cu, showing crystal-nematic liquid crystal and nematic liquid crystal-isotropic transition temperatures ($T_{CN}$ and $T_{NI}$, respectively) as a function of 12-8N-Cu concentration.

The following table presents crystal to nematic phase and nematic phase to istropic transition temperatures ($T_{CN}$ and $T_{NI}$, respectively) for 12-8N-Cu/A6-O8N—Cu mixtures containing various concentrations of 12-8NCu, ranging from 0% (i.e. pure A6-O8N—Cu) to 100% (i.e. pure 12-8NCu). Reference is now made to FIG. 2, which presents graphically a portion of the phase diagram determined from the measurements given in the table. The lower line represents $T_{CN}$ and the upper line $T_{NI}$ as a function of 12-8NCu concentration in weight percent.

| 12-8NCu (% wt) | $T_{CN}$ (° C.) | $T_{NI}$ (° C.) |
|---|---|---|
| 0 | 81.6 | 116.0 |
| 25 | 71.2 | 117.7 |
| 50 | 80.8 | 122.0 |
| 75 | 90.8 | 124.4 |
| 100 | 103.5 | 129.0 |

Example 17

Binary Metallomesogen/Ligand (ML/L): Pd-L$_1$/H-L$_1$

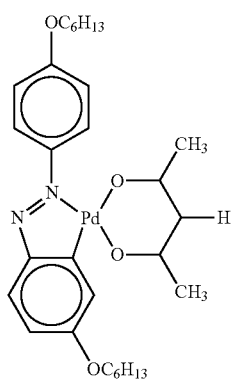
Pd-L1

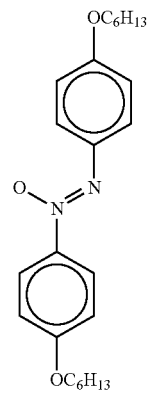
H-L1

| Pd—L1 (% mole) | $T_{IN}$ (° C.) | $T_{NC}$ (° C.) |
|---|---|---|
| 0 | 113.5 | 99 |
| 2 | 111.5 | 94.5 |
| 3 | 111. | 94 |
| 5 | 106 | 92 |
| 50 | 102 | 77 |
| 100 | — | 116.5 |

Figure 3:
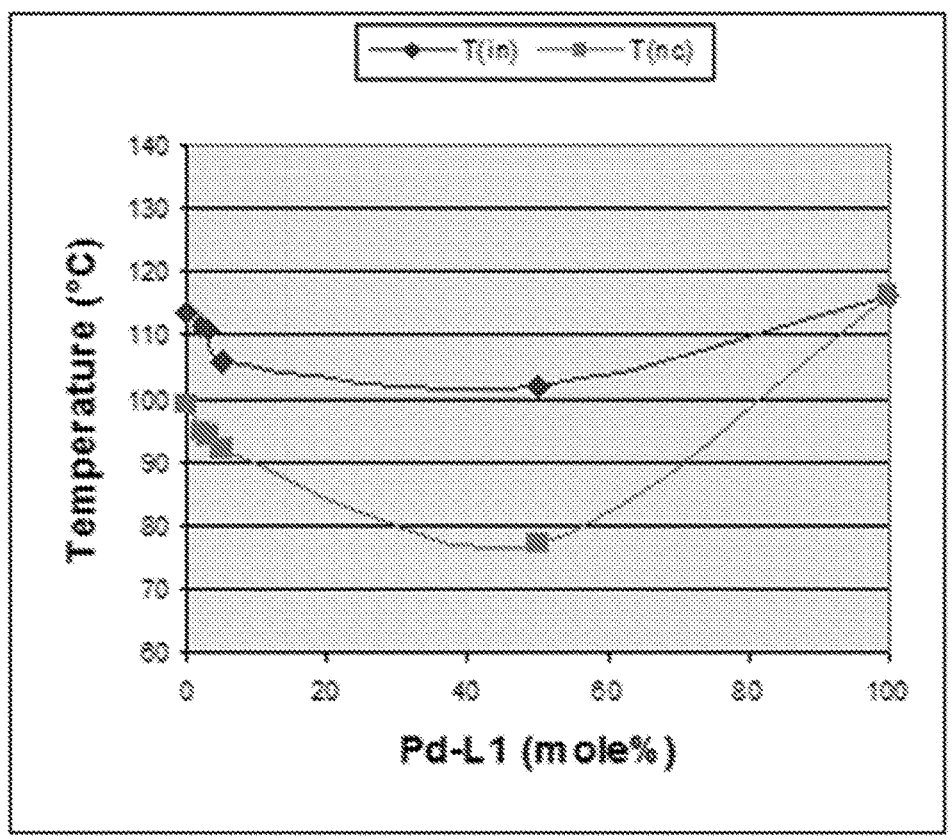
FIG. 3 presents a portion of a phase diagram for binary mixtures of Pd-$L_1$ and H-$L_1$, showing $T_{CN}$ and $T_{NI}$ as a function of Pd-$L_1$ concentration.

Reference is now made to FIG. 3, which shows graphically a portion of the phase diagram for mixtures of Pd-L$_1$ and H-L$_1$ as determined from the data given in the preceding table. The lower line shows $T_{CN}$, and the upper line shows $T_{NI}$, for Pd-L$_1$/H-L$_1$ mixtures as a function of Pd-L$_1$ concentration in mole percent.

Example 18

Ternary Metallomesogen/Metallomesogen/Ligand Mixture (MLm/Lm/MLn): Pd-L2/H-L2 (62.3:37.7)+Pd-L6

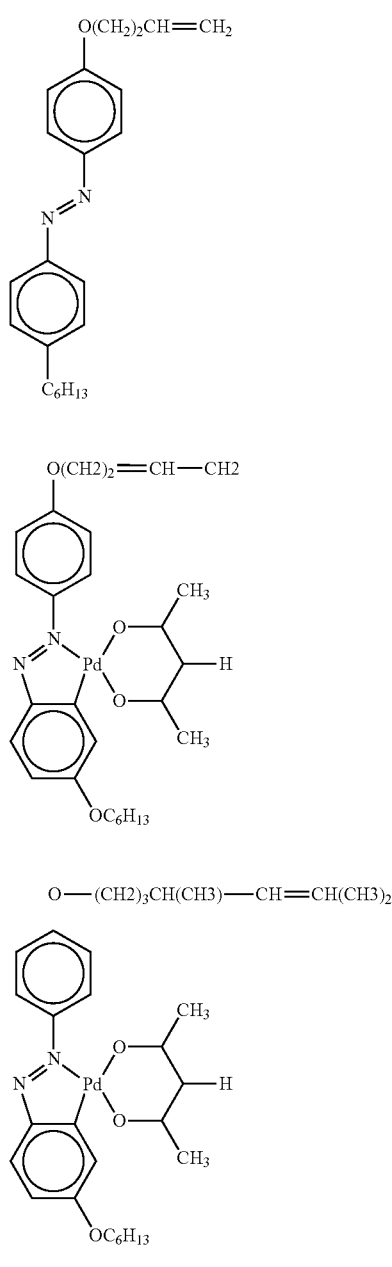

| Pd—L6 (% mole) | $T_{IN^*}$ (° C.) | $T_{N^*C}$ (° C.) |
|---|---|---|
| 0 | 45.9 | −35 |
| 2 | 41.3 | −35 |
| 5 | 41.7 | −35 |
| 10 | 41.3 | −35 |
| 20 | 44.2 | −35 |
| 35 | 46.7 | −5 |
| 100 | 63.6 | 33.8 |

Figure 4:
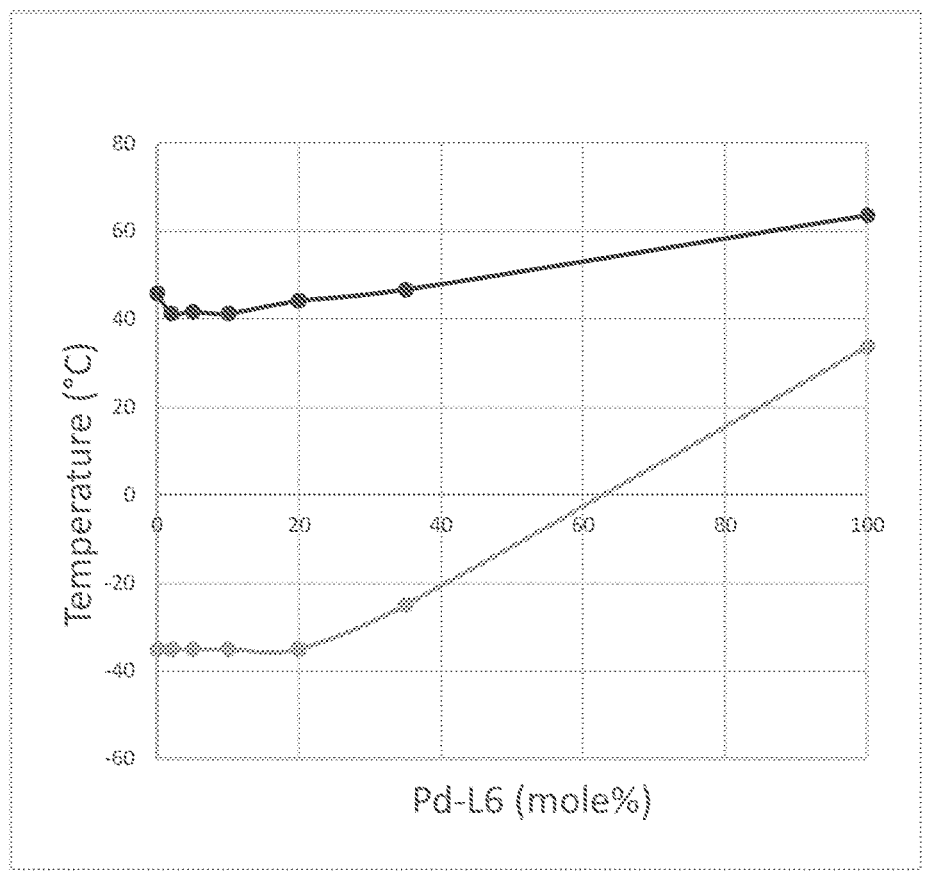
FIG. 4 presents a portion of a phase diagram for ternary blends of a 62.3: 37.7 Pd-$L_2$/H-$L_2$ mixture with Pd-$L_6$, showing $T_{CN}$ and $T_{NI}$ as a function of Pd-$L_6$ concentration.

Reference is now made to FIG. 4, which presents a portion of the phase diagrams for ternary blends of Pd-L6 with a 62.3:37.7 (mole percent) PdL2-HL2 mixture. The lower line represents $T_{CN}$, and the upper line represents $T_{NI}$ as a function of Pd-L6 concentration in mole percent.

Example 19

Guest-Host Metallomesogen/Ligand/NLC Mixture: $PdL_2$/$HL_2$ (62.3:37.7)/TN10427

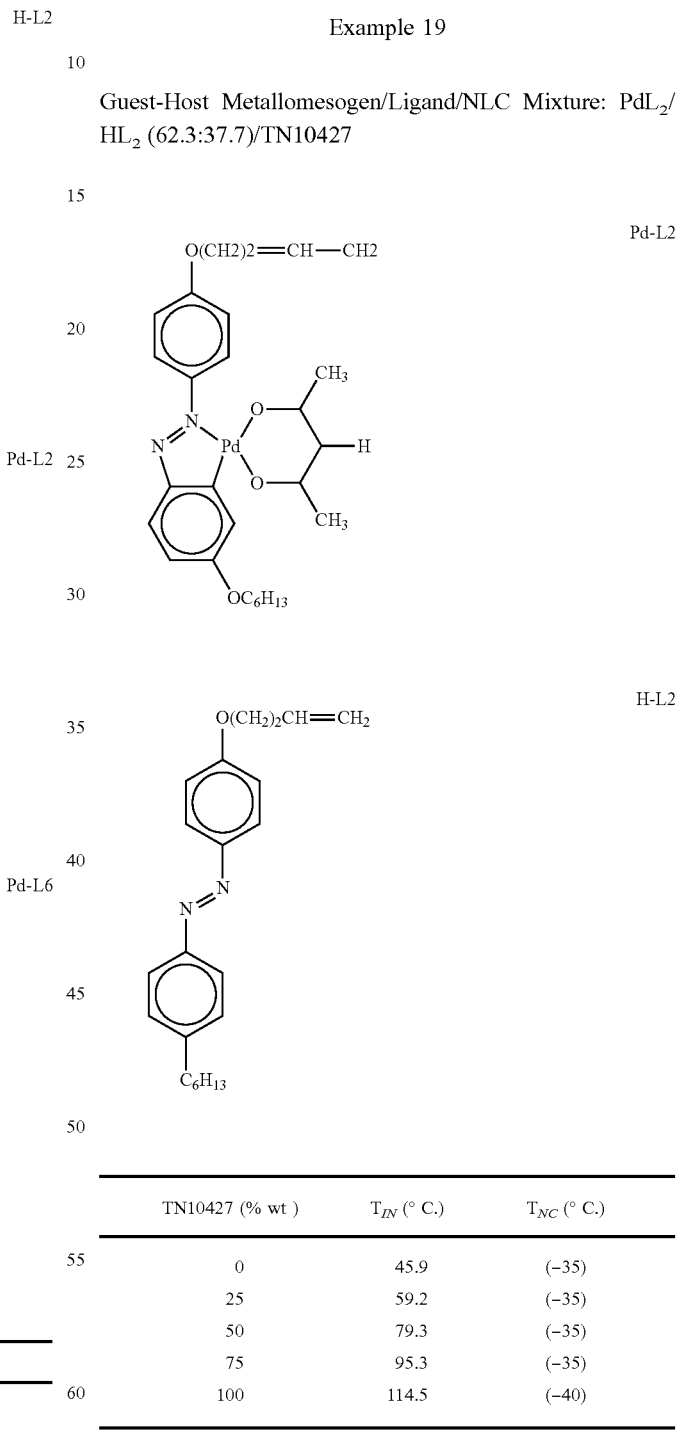

| TN10427 (% wt) | $T_{IN}$ (° C.) | $T_{NC}$ (° C.) |
|---|---|---|
| 0 | 45.9 | (−35) |
| 25 | 59.2 | (−35) |
| 50 | 79.3 | (−35) |
| 75 | 95.3 | (−35) |
| 100 | 114.5 | (−40) |

Figure 5:
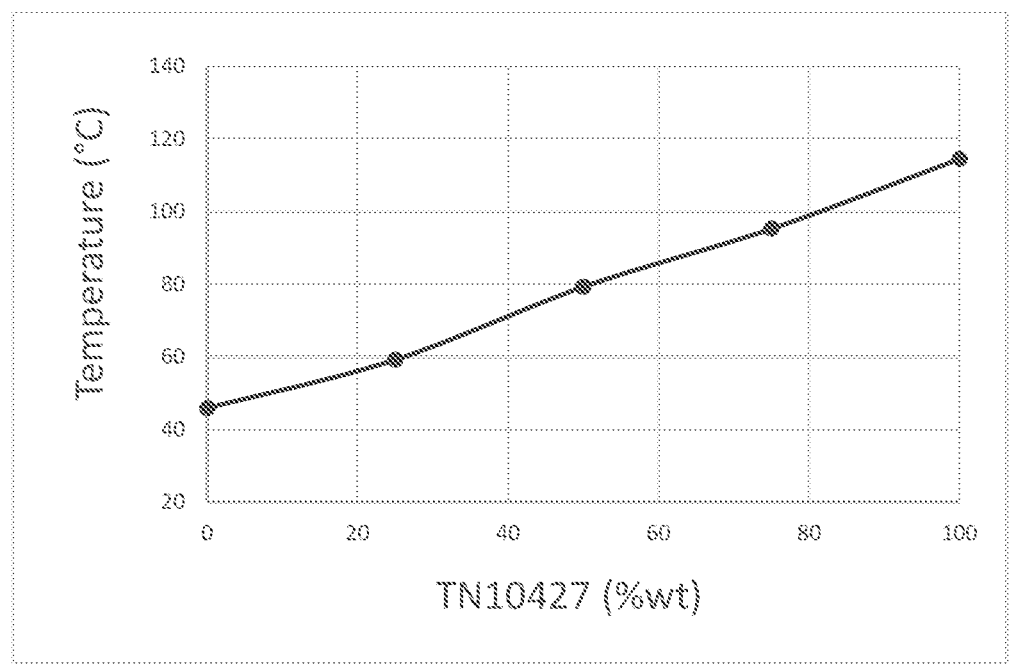
FIG. 5 presents a graph showing $T_{NI}$ of guest-host solutions of a 62.3: 37.7 Pd-$L_2$/H-$L_2$ mixture in TN10427 as a function of TN10427 concentration.

Reference is now made to FIG. 5, which shows the nematic-isotropic transition temperature for guest-host solutions of a 62.3: 37.7 $PdL_2$/$HL_2$ blend with TN10427 as a function of TN10427 concentration in weight percent.

Example 20

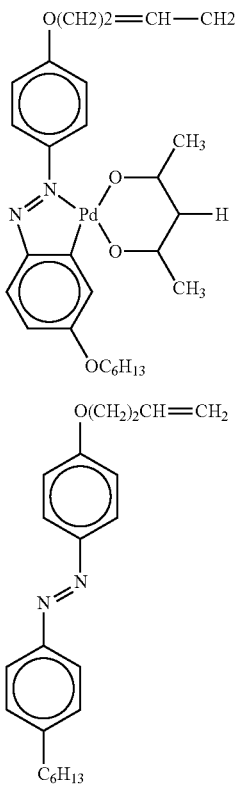

Guest-Host Metallomesogen/Ligand/NLC Mixture: PdL$_2$/HL$_2$ (62.3:37.7)/E43

| TNO623 (% wt) | T$_{IN}$ (° C.) | T$_{NC}$ (° C.) |
|---|---|---|
| 0 | 45.9 | −35 |
| 25 | 57.4 | −25.8 |
| 50 | 73.8 | −14.3 |
| 75 | 74.0 | −10.5 |
| 100 | 77.8 | −4.3 |

Figure 6:
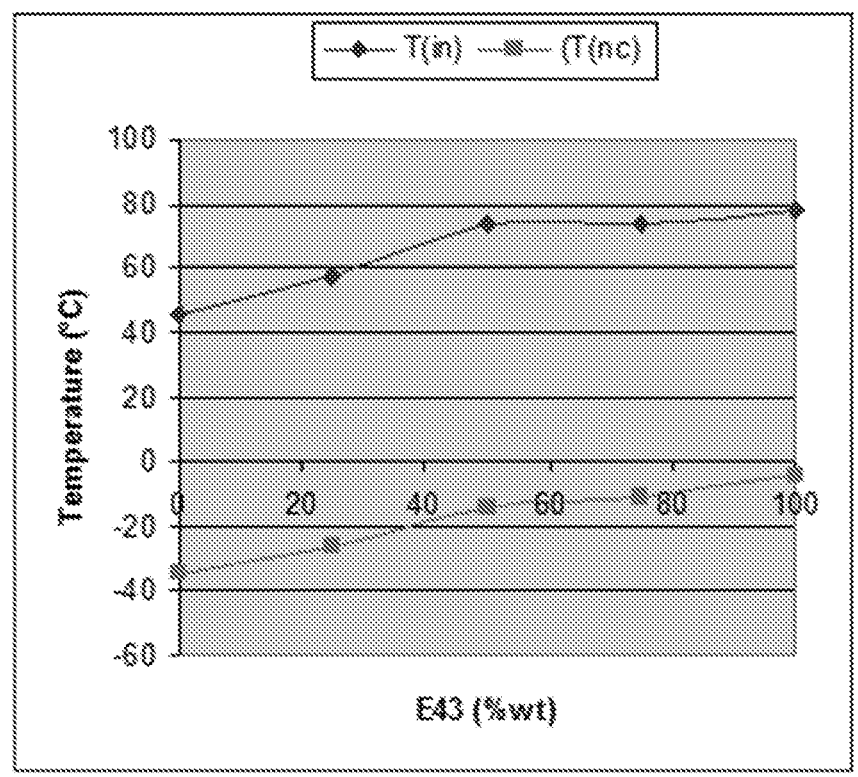
FIG. 6 presents a portion of a phase diagram for ternary blends of a 62.3: 37.7 Pd-L$_2$/H-L$_2$ mixture with E43, showing T$_{CN}$ and T$_{NI}$ as a function of E43 concentration.

Reference is now made to FIG. 6, which shows a portion of the phase diagram for ternary blends of a 62.3: 37.7 PdL$_2$/HL$_2$ blend with E43 derived from the data in the preceding table. T$_{CN}$ (lower line) and T$_{NI}$ (upper line) are shown as a function of E43 concentration in weight percent.

Example 21

Binary Metallomesogen Eutectic Mixture A11O-6ON-Ni/A11O-6ON-VO

We studied the miscibility of a binary metallomesogen (MOM) mixture consisting of A11O-6ON-Ni and A11O-6ON-VO, having the same parent ligand and different complex metals Ni and VO. The melting and nematic-isotropic transition temperatures (T$_m$, T$_{ni}$) were measured by Differential Scanning calorimeter (Perkin Elmer DSC7, scanning rate 5° C./min). The results presented in the following table and graph, indicate that the MOMs have good miscibility, due to linear trend of their T$_{ni}$ within the whole phase diagram, as well as a eutectic behavior at 40.1% A11O-6ON-Ni with lowest T$_m$ (89° C.) than the either components.

| A11O6ON—Ni (wt %) | T$_{CN}$ (° C.) | T$_{NI}$ (° C.) |
|---|---|---|
| 0 | 119 | 144 |
| 20.7 | 98 | 139 |
| 40.1 | 89 | 135 |
| 60.6 | 92 | 132 |
| 81.2 | 100 | 127 |
| 100 | 107 | 124 |

Figure 7:
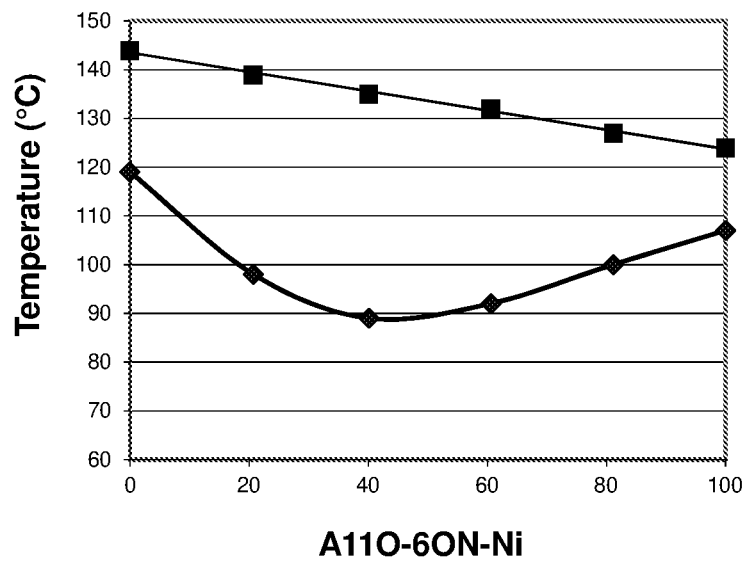
FIG. 7 presents a portion of a phase diagram for binary mixtures of A11O-6ON-Ni and A11O-6ON-VO, showing T$_{CN}$ and T$_{NI}$ as a function of A11O-6ON-Ni concentration.

Reference is now made to FIG. 7, which shows a portion of the phase diagram for binary mixtures of A11O-6ON-Ni and A11O-6ON-VO derived from the data in the preceding table. T$_{CN}$ (lower line) and T$_{NI}$ (upper line) are shown as a function of A11O-6ON-Ni concentration in weight percent.

Example 22

Binary Metallomesogen-Ligand Eutectic Mixture L1Pd-acac/HL1

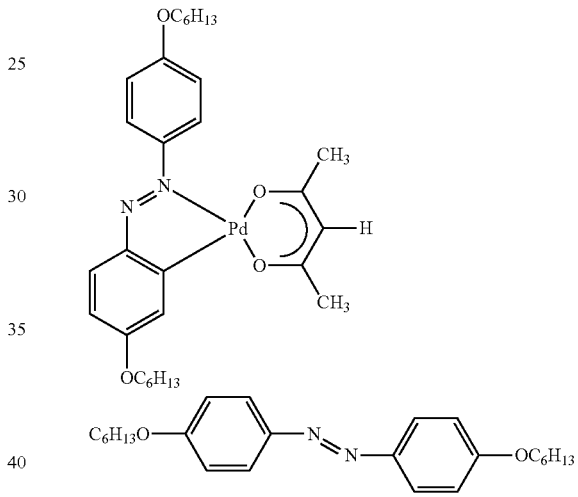

The phase diagram for a mixture of a metallomesogen (MOM) L1Pd-acac and its ligand HL1 was determined. All temperatures were measured by using an optical microscope with a heating apparatus and a Differential Scanning calorimeter. The transition temperatures of this binary mixture were reported in the following table and diagram. The results show a complete miscibility of the binary mixture and a eutectic behavior at 62.3 mole % of L1Pd-acac with liquid crystal range of −35° C. to +45.9° C.

| Pd—L2 (% mole) | T$_{IN}$ (° C.) | T$_{NC}$ (° C.) |
|---|---|---|
| 0 | 48.1 | 14.8 |
| 3.3 | 49.4 | 13.6 |
| 8.1 | 48.9 | 10.8 |
| 29.2 | 46.9 | −11 |
| 62.3 | 45.9 | −35 |
| 100 | 43.1 | −12 |

Figure 8:
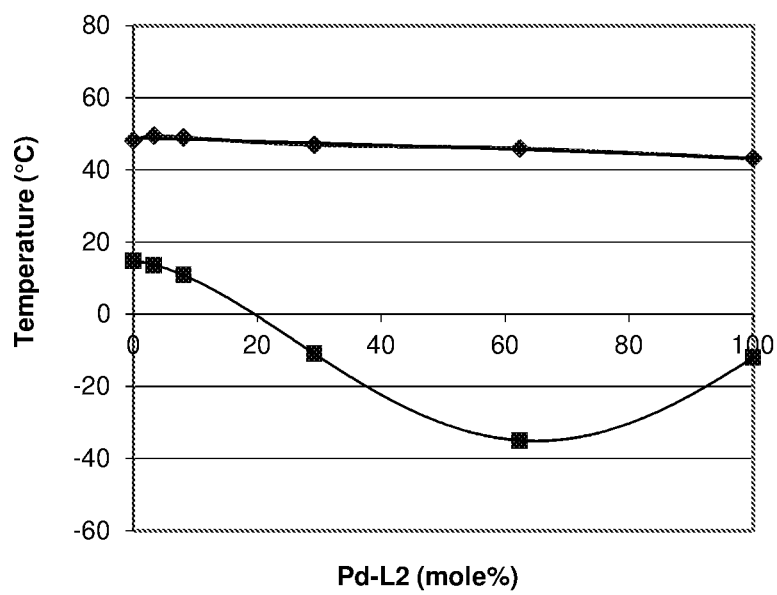
FIG. 8 presents a portion of a phase diagram for binary mixtures of L$_1$Pd-acac and H-L$_1$, showing T$_{CN}$ and T$_{NI}$ as a function of LiPd-acac concentration.

Reference is now made to FIG. 8, which shows a portion of the phase diagram for binary mixtures of L1Pd-acac and HL1 derived from the data in the preceding table. T$_{CN}$ (lower line) and T$_{NI}$ (upper line) are shown as a function of Pd-L2 concentration in mole percent.

Example 23

Ternary Mixture of Nematic L5Pd-acac and L1Pd-acac/HL1

The miscibility and thermal behavior of a ternary mixtures composed of the binary eutectic mixture HL1/L1Pdacac (37.7%:62.3%) and MOM L5Pdacac complex (Tm=69.1° C., Tin=39.1° C., Tnc=23.8° C.) were studied by optical microscopy and DSC. The results indicate that, the components are miscible at above 25% wt of HL1/L1Pdacac in the mixture. The thermal behavior of the mixtures is reported below. All mixtures are nematic at room temperatures and no crystallization was observed in any of the mixtures.

| HL1/L1Pdacac (wt %) | Tni (° C.) | Tin (° C.) | Tnc (° C.) |
|---|---|---|---|
| 50 | 38.9 | 35.2 | <−35 |
| 65 | 37.94 | 32.8 | <−35 |
| 80 | 44.4 | 40.8 | <−35 |
| 95 | 46.3 | 42.2 | <−35 |

Example 24

Ternary Mixture of Cholesteric L6*Pd-acac and L1Pd-acac/HL1

The miscibility and thermal behavior of a ternary mixtures composed of the binary eutectic mixture HL1/L1Pdacac (37.7%:62.3%) and MOM L6*Pdacac complex (Tm=52.2° C., Tn*i=68.6° C., Tin*=63.6° C., Tn*c=33.8° C.) were studied by optical microscopy and DSC. The results indicate that, the components are miscible at above 25% wt of HL1/L1Pdacac in the mixture. The thermal behavior of the mixtures are reported below. The complex L6Pdacac is an enantiotropic chiral nematic or "cholesteric" liquid crystal. There were good solubility between the components in all concentration ranges of mixtures with cholesteric phase and no crystallization was observed in all mixtures.

| HL1/L1Pdacac (wt %) | Tn*I (° C.) | Tin* (° C.) | Tn*c (° C.) |
|---|---|---|---|
| 65 | 49.3 | 46.7 | <−35 |
| 80 | 46.7 | 44.2 | <−35 |
| 90 | 45.5 | 41.3 | <−35 |
| 95 | 46.7 | 47.7 | <−35 |
| 98 | 45.5 | 41.3 | <−35 |

C. Examples of Guest-Host Mixtures

Metallomesogen Solubility in Guest—Host Systems

The solubility of these metallomesogen materials exhibited either nematic, cholesteric or smectic mesophases. The mixtures showed large mesomorphic range and lower transition temperatures than those of the single-components metallomesogens. In most cases, these materials did not crystallized upon super-cooling or quenching and maintained their mesomorphism even below 0° C.

These materials consisted of binary, ternary and multicomponent mixtures incorporating both metallomesogens and their parent ligands. The phase diagram studies indicated a good miscibility of the components and frequently provided mixtures with eutectic behavior, having a wider mesophase and lower transition temperature than those of their components. In some cases, we even obtained mixtures with mesophase stability within (−30° C.-(+45° C. temperature range, useful for application.

Ternary Guest-Host Mixtures:
M−Lm+Lm+M−Ln
M1−Lm+Lm+M2−Lm
Lm−M−Lm+Ln−M−Ln+Lp−M−Lp
Lm−M−Lm+Lm−M−Ln+Ln−M−Ln
(M−Lm+Lm)+NLC
(M−Lm+Lm)+CLC

Example 25

Miscibility of L1Pd-acac/HL1 in Liquid Crystal Host

The solubility of eutectic mixture in the liquid crystal TN10427 (Rolic) was studied. The eutectic L1Pd-acac/HL1 (62.3:37.7) has a nematic liquid crystal range within −35° C. and +45.9° C., whereas the transition temperature of TN10427 on cooling are: Tin=114.5° C., Tnc<−35° C. The solutions were prepared by mixing different percentages of L1Pd-acac/HL1 in TN10427 host and their thermal behavior were then examined by optical microscopy and Differential Scanning calorimeter.

The isotropic-nematic (Tin) phase behavior of this guest-host ternary mixture, as reported in the following table and graph, shows a linear trend within the whole concentration range of the phase diagram, indicating complete miscibility of the solutions at all concentrations. The solutions are all nematic at room temperature and no crystallization was observed also after many days.

| TN10427 (% wt) | $T_{IN}$ (° C.) | $T_{NC}$ (° C.) |
|---|---|---|
| 0 | 45.9 | (−35) |
| 25 | 59.2 | (−35) |
| 50 | 79.3 | (−35) |
| 75 | 95.3 | (−35) |
| 100 | 114.5 | (−40) |

Figure 9:
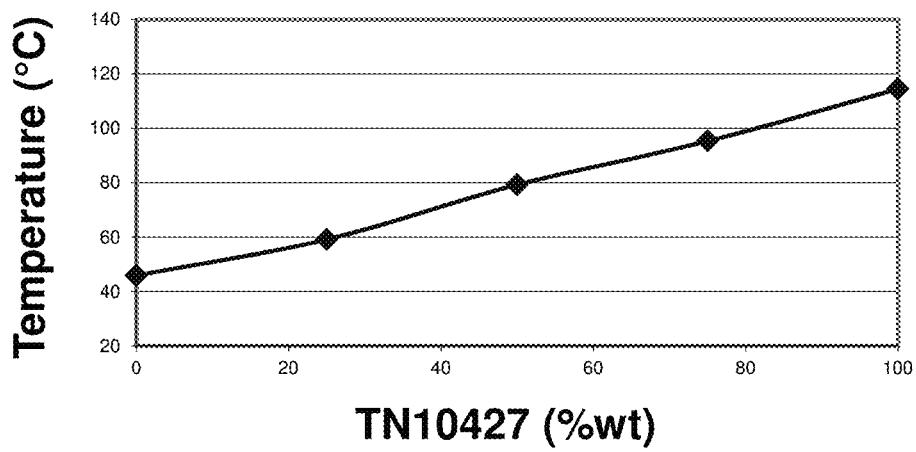
FIG. 9 presents a graph showing T$_{NI}$ of guest-host solutions of a 62.3:37.7 LiPd-acac/H-L$_1$ mixture in TN10427 as a function of TN10427 concentration; and, FIG. 10 presents visible light reflection spectra for NOA65/TNO623 PDLC films with and without MOMs.

Reference is now made to FIG. 9, which shows the $T_{NI}$ transition temperature of a guest-host solution containing a 62.3:37.7 mixture of L1Pd-acac and HL1 combined with TN10427 as a function of TN10427 concentration in weight percent.

C. Examples of MOM-PDLC

Example 26

Effects of Ligand Metallomesogen on Electrooptics of PDLC E43/CB15 (9:1)+PdL$_1$ and L1

| Additive | Concentration (wt %) | $V_{fc}/V_{ne}$ (volts) | $T_{fc}/T_{ne}$ (%) | ρ (MΩm) | $\tau_{on}/\tau_{off}$ (msec) |
|---|---|---|---|---|---|
| None | 0 | 10/30 | 4.1/96.2 | 37 | 6/14 |
| L1 | 5 | 16/30 | 4.5/82.2 | 44 | 75/5 |
|  | 10 | 16/32 | 2.5/75.0 | 34 | 75/6 |
| PdL1 | 5 | 22/35 | 3.0/84.4 | 23 | 20/10 |
|  | 10 | 20/33 | 3.0/98.5 | 12 | 50/5 |
| None | 0 | 16/31 | 3.0/97.4 | 40 | 5/10 |
| L6 | 5 | 18/33 | 5.5/91.1 | 45 | 6/14 |
| PdL6 | 5 | 14/24 | 5.0/76.4 | 12 | 7/20 |
|  | 10 | 12/26 | 4.8/93.5 | 14 | 8/17 |

As shown in the table the combination of ligand and metallomesogen comprise an improvement in the electrooptics. For example, in the PdL$_6$ compound the voltage needed to activate the focal conic state ($V_{fc}$) decreases from 18V (of the ligand alone) to 12V (of the compound at 10%), as well as for the nematic state the voltage needed decreases from 33V (of the ligand alone) to 26V (of the compound at 10%). There is also an improvement at the transmission level. As shown in the PdL1 compound at 10%, the transmission in focal conic state decreases to 3% and in nematic states increases up to 98.5%.

Example 27

Effects of Metallomesogen Concentration on PDLC Aging NOA65/(Tn0623+7-8Ncu)

| | 7-8NCu (wt %) | | | |
| --- | --- | --- | --- | --- |
| Ageing (days) | 0 | 1 | 2 | 6.5 |
| | | $V_{90}$ (volts) | | |
| 1 | 18 | 12 | 13 | 14 |
| 15 | 20 | 14 | 14 | 16 |
| 30 | — | 14 | 15 | 15 |
| 120 | — | 18 | 16 | 16 |
| 150 | 32 | — | 17 | — |
| 260 | 40 | 19 | 21 | 18 |

| L2—Pd (wt %) | Ageing (days) | V10 | V90 | Toff | Ton |
| --- | --- | --- | --- | --- | --- |
| 0 | 1 | 11 | 18 | 0.5 | 89.5 |
| | 150 | 21 | 32 | 0.5 | 92.8 |
| 0.50 | 1 | 11 | 17 | 0.46 | 91.1 |
| | 150 | 13 | 20 | 0.5 | 92.1 |
| 1 | 1 | 8 | 14 | 1.1 | 91.4 |
| | 150 | 13 | 22 | 1.1 | 97.2 |
| 2 | 1 | 11 | 19 | 0.58 | 89 |
| | 150 | 17 | 27 | 0.5 | 89.3 |

| 7-8Ncu (wt %) | Ageing (days) | V10 | V90 | Toff | Ton |
| --- | --- | --- | --- | --- | --- |
| 0 | 1 | 16 | 24 | 0.3 | 82.6 |
| | 260 | 16 | 26 | 0.6 | 91.7 |
| 1 | 1 | 7 | 12 | 1.9 | 88.7 |
| | 30 | 8 | 14 | 3.4 | 96.2 |
| | 120 | 9 | 16 | 3.5 | 99.1 |
| 2 | 1 | 8 | 13 | 0.7 | 89.4 |
| | 30 | 10 | 15 | 3.7 | 99.9 |
| | 120 | 10 | 16 | 3.7 | 98.2 |
| | 260 | 12 | 21 | 3.9 | 95.1 |
| 6.5 | 1 | 8 | 14 | 1.3 | 76.5 |
| | 30 | 9 | 15 | 2.2 | 91.1 |
| | 120 | 10 | 16 | 2.7 | 89.6 |
| | 260 | 11 | 18 | 3.3 | 88.8 |

Example 28

Effect of Metallomesogen in Uv Curing Intensity of PDLC NOA65/(TN0623+Cu-LC1)

| $I_{UV}$ (mW/cm$^2$) | Cu—LC1 (% w/w) | $V_{10}$ (Volts) | $V_{90}$ (Volts) | $T_{off}$ (%) | $T_{on}$ (%) |
| --- | --- | --- | --- | --- | --- |
| 15 | 0 | 7 | 33 | 5.56 | 83.5 |
| 15 | 7.5 | 7 | 14 | 5.58 | 78.2 |
| 45 | 0 | 13 | 68 | 2.4 | 80.3 |
| 45 | 7.5 | 6 | 21 | 3.0 | 75.9 |

Example 29

Effect of Metallomesogen on Voltage of PDLC Matrix

| Formulation Type | MOM | $V_{10}$ | $V_{90}$ |
| --- | --- | --- | --- |
| Epoxy | None | 12 | 20 |
| | PdUC | 8 | 14 |
| | 7-8NCu | 7 | 12 |
| | 9-8NCu | 8 | 14 |
| UV-cureable | None | 16 | 33 |
| | CuLC1 | 8 | 20 |

Example 30

Effect of Metallomesogen Concentration on the Angular Transmittance of PDLC Film

| | A11O—8NPd (% w/w) | | |
| --- | --- | --- | --- |
| | 0 | 2 | 6.5 |
| Angle (degree) | | Transmittance (%) | |
| 0 | 91.6 | 93.5 | 95.5 |
| 15 | 93.5 | 91.6 | 95.3 |
| 30 | 88 | 86.7 | 91.5 |
| 45 | 65.3 | 71.9 | 79.9 |
| 60 | 41.7 | 51.3 | 60.8 |

Example 31

Effect of Metallomesogen on Color Reflection of PDLC Film NOA65/TNO623/L1Pd-acac (50:42.5:2.5); d=15 □m, T=25° C.

Polymer dispersed liquid crystal (PDLC) films were prepared by mixing and curing a suitable UV-curable resin NOA 65, TN0623 liquid crystal and L1Pd-acac yellow metallomesogen complex.

The percentage L1Pd-acac was 2.5% with respect to the liquid crystal. The mixture was coated between two ITO-glass supports at 10 μm thickness of PDLC layer and cured with UV radiation at 12 mW/cm$^2$ intensity. In the table below, we present the reflection spectra of PDLC films with and without MOM dye.

Figure 10:
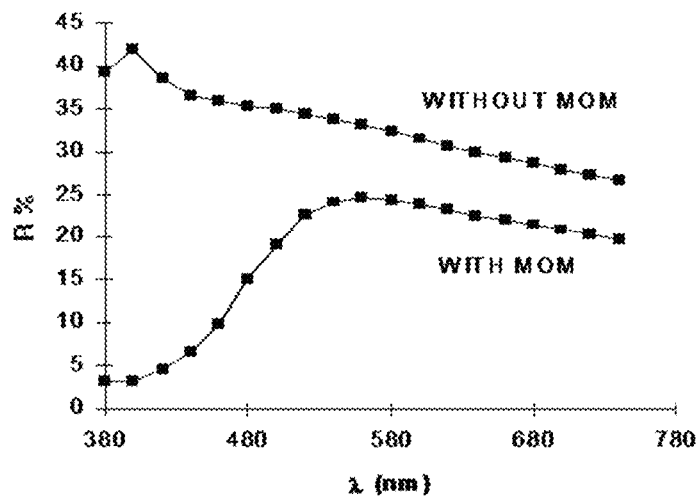

Reference is now made to FIG. 10, which shows visible reflection spectra (reflected light as a function of wavelength) of NOA65/TNO623 PDLC films with and without MOM (lower and upper lines, respectively).

Eutectic mixtures of metallomesogens homologues per se and metallomesogens homologues with their parent ligands are in the scope of the present invention.

It should be emphasized that, depending on their chemical structure, metallomesogen-chromophore compositions could be highly soluble (>5%) in liquid crystal hosts, such as phenyl benzoate ((±)-4-(4-methylhexyloxy) phenyl 4-decyloxybenzoate).

The metallomesogen-chromophore compositions could provide a mesogenic phase in wide temperature range which is very important for exploiting switching polymer dispersed liquid crystal devices in different climatic zones.

A black color of the polymer dispersed liquid crystal film can be achieved both a single dye and by means of additive synthesis of RGB dye components.

High absorption in UV and near IR spectral range provided by the metallomesogen-chromophore compositions is characterized by temporary stable behavior due to strong metal complex bonds.

According to the present invention, the metallomesogen-chromophore compositions are addable to liquid crystal guest host solutions used in LCD devices. Large area smart polymer dispersed film or glasses can be used as switchable windows in architecture and automotive industry.

The highly soluble eutectic dye mixtures based on metallomesogen-chromophore compositions can be used in manufacturing colored switchable glazing and displays.

High electro-optical performance of LCD devices based on metallomesogen-chromophore dyes is harmonized with their extended color stability in UV, visual and IR spectral ranges.

Practical applications of the metallomesogen-chromophore-dye technology are in the fields of colored dynamic architectural windows, automotive, marine and aviation glazing. Use as UV and IR (heat) dynamic absorbers in the abovementioned fields are also in the scope of the present invention.

It should be emphasized that, LCD devices based on metallomesogen could be also used as UV and IR switchable absorbing glazing and displays.

Example 32

Electrooptical Properties of MOM and Dichroic Dyes Doped PDLC by Natural Aging (Epon/Capcure/Heloxy)/TNO623/L1-Pd-acac (50:45:5) (Epon/Capcure/Heloxy)/TNO623/Merck YDD (50:45:0.05)

| Dye | Color | $T_{off}$ (%) | $T_{on}^0$ (%) | $T_{on}^{60}$ (%) | $V_{10}$ (volts) | $V_{90}$ (volts) | $\tau_{on}/\tau_{off}$ (msec) | $\rho$ (MΩ·m) | Hyster (volts) |
|---|---|---|---|---|---|---|---|---|---|
| As-made PDLC | | | | | | | | | |
| L1-Pd-acac | yellow | 0.41 | 88 | 53 | 16 | 32 | 50/45 | — | 14 |
| Merck YDD | yellow | 0.12 | 81 | 38 | 19 | 31 | 65/65 | — | 17 |
| 2-Year Aged PDLC | | | | | | | | | |
| L1-Pd-acac | yellow | 0.10 | 82 | 33 | 24 | 39 | — | 31.5 | 8 |
| Merck YDD | yellow | 0.11 | 70 | 30 | 18 | 47 | — | 16.8 | 9 |

What is claimed is:

1. A dichroic mesogenic dye composition, wherein:
   said dichroic mesogenic dye composition is soluble within a liquid crystal host; and,
   said composition comprises metallomesogen (MOM) molecules represented by a formula $R^1$—$R^2$—$R^3$, wherein:
   $R^1$ and $R^3$ each independently represents a polycyclic structure comprising at least one aromatic group having a heterocyclic structure;
   $R^2$ represents a polycyclic structure comprising at least one aromatic group having an unsaturated heterocyclic structure having bonded thereto:
   a vanadium-containing metallic moiety; and,
   at least one $NO_2$ chromophore group.

2. The dichroic mesogenic dye composition of claim 1, wherein said liquid crystal host is selected from the group consisting of polymer dispersed liquid crystal (PDLC), polymer network liquid crystal (PNLC), polymer stabilized liquid crystal (PSLC), and liquid crystal displays (LCD).

3. The dichroic mesogenic dye composition according to claim 1, wherein said composition is in a form of a eutectic mixture comprising components selected from the group consisting of MOM homologues and parent ligands of said MOM homologues.

4. The dichroic mesogenic dye composition according to claim 1, wherein said heterocyclic structure contains at least one aromatic structure that is fused to either another aromatic structure or to an alicyclic structure through at least one connection selected from the group consisting of:
   a covalent bond;
   at least one polyfunctional organic group selected from the group consisting of alkylene, alkenylene, alkylidene, alkenylidene, alkylidyne, alkynylidene, alkynylene, carbonyloxy ester, carbonylimino, azomethine; and,
   inorganic polyfunctional groups selected from the group consisting of amino, azino, azo, azoxy, diazoamino, sulfide, disulfide, polysulfide, ether (oxy), keto, and diketo.

5. The dichroic mesogenic dye composition according to claim 1, wherein said MOM comprises a metal bonded multi-aromatic unit of at least two aromatic groups covalently joined, either directly or through other polyvalent organic or inorganic connecting groups.

6. The dichroic mesogenic dye composition according to claim 1, wherein $R^2$ contains a ring atom of a saturated structure or an unsaturated heterocyclic structure and thus constitutes part of the aromaticity of the composition.

7. The dichroic mesogenic dye composition according to claim 1, wherein said MOM molecule is selected from the group consisting of compounds represented by formulae (10B), (10C), and (10D):

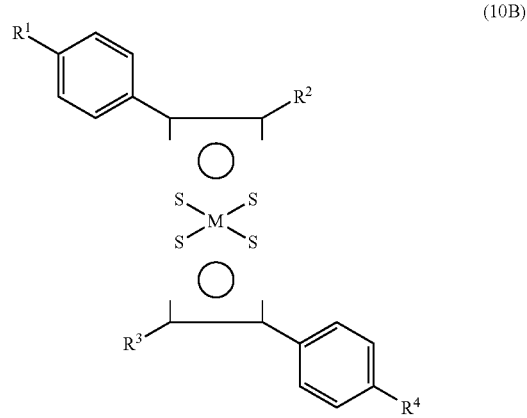

(10B)

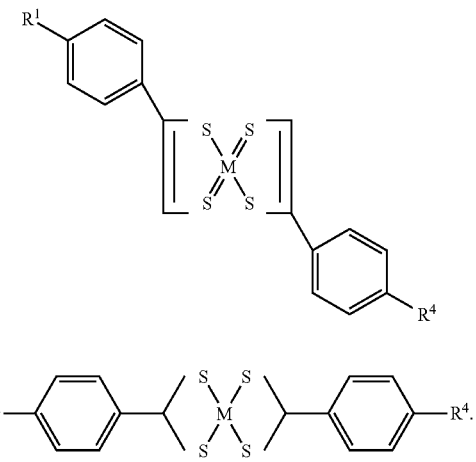

8. The dichroic mesogenic dye composition according to claim 1, wherein said composition comprises at least one eutectic mixture of MOMs.

9. A liquid crystal device, comprising a dichroic mesogenic dye composition according to claim 1; wherein said PDLC device is switchable.

10. A method for manufacturing a dichroic mesogenic dye composition soluble within a liquid crystal host device, said composition comprising metallomesogen (MOM) and said method comprising:
  synthesizing MOM molecules;
  dissolving said MOM molecules or eutectic mixtures thereof in a liquid crystal host, thereby creating an MOM-liquid crystal guest-host mixture;
  dispersing said MOM-liquid crystal guest-host mixture in a device comprising at least one host selected from the group consisting of PDLC, PNLC, PSLC and LCD;
  using said host in which said MOM-liquid crystal guest-host mixture is dispersed in manufacturing a PDLC, PNLC, PSLC or LCD device;
  wherein said step of synthesizing MOM molecules comprises synthesizing MOM molecules comprising:
    a polycyclic structure comprising at least aromatic group having an unsaturated heterocyclic structure having bonded thereto:
      a vanadium-containing metallic moiety; and,
      at least one $NO_2$-containing chromophore group;
    thereby synthesizing a dichroic mesogenic dye composition according to claim 1.

11. A method for manufacturing a liquid crystal device, said liquid crystal device comprising a mesogenic dye composition dispersible within a polymer dispersed liquid crystal, and said composition comprising dichroic metallomesogen (MOM); said method comprising:
  synthesizing MOM molecules;
  dissolving said MOM molecules or a eutectic mixture thereof in a liquid crystal host, thereby creating an MOM-liquid crystal guest-host mixture;
  dispersing said MOM-liquid crystal guest-host mixture in a device comprising at least one host selected from the group consisting of PDLC, PNLC, PSLC and LCD;
  using said host in which said MOM-liquid crystal guest-host mixture is dispersed in manufacturing a PDLC, PNLC, PSLC or LCD device;
  including said composition within two transparent conductive support films, thereby creating a new film;
  curing said newly created film, thereby producing a cured film; and,
  introducing said cured film into the device;
  wherein said step of synthesizing MOM molecules comprises synthesizing MOM molecules comprising:
    a polycyclic structure comprising at least aromatic group having an unsaturated heterocyclic structure having bonded thereto:
      a vanadium-containing metallic moiety; and,
      at least one $NO_2$-containing chromophore group;
    thereby synthesizing a dichroic mesogenic dye composition according to claim 1; further wherein said device is switchable.

* * * * *